US012623481B2

(12) United States Patent
Fujiwara

(10) Patent No.: US 12,623,481 B2
(45) Date of Patent: May 12, 2026

(54) IDENTIFICATION MEDIUM, ARTICLE, AND IDENTIFICATION MEDIUM USE METHOD

(71) Applicant: ZEON CORPORATION, Tokyo (JP)

(72) Inventor: Natsumi Fujiwara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 903 days.

(21) Appl. No.: 17/759,200

(22) PCT Filed: Jan. 29, 2021

(86) PCT No.: PCT/JP2021/003326
§ 371 (c)(1),
(2) Date: Jul. 21, 2022

(87) PCT Pub. No.: WO2021/153761
PCT Pub. Date: Aug. 5, 2021

(65) Prior Publication Data

US 2023/0076172 A1 Mar. 9, 2023

(30) Foreign Application Priority Data

Jan. 31, 2020 (JP) ................................ 2020-015438

(51) Int. Cl.

| | |
|---|---|
| ***B42D 25/364*** | (2014.01) |
| ***G02B 5/30*** | (2006.01) |
| ***G02C 7/12*** | (2006.01) |

(52) U.S. Cl.
CPC ......... *B42D 25/364* (2014.10); *G02B 5/3025* (2013.01); *G02B 5/3083* (2013.01); *G02C 7/12* (2013.01)

(58) Field of Classification Search
CPC .. B42D 25/364; G02B 5/3025; G02B 5/3083; G02C 71/02

(Continued)

(56) References Cited

U.S. PATENT DOCUMENTS 4,705,356 A 11/1987 Berning et al.
5,284,364 A * 2/1994 Jain ...................... B42D 25/391 283/89

(Continued)

FOREIGN PATENT DOCUMENTS

CN 107132607 A 9/2017
EP 0720753 A1 7/1996

(Continued)

OTHER PUBLICATIONS

Mar. 30, 2021, International Search Report issued in the International Patent Application No. PCT/JP2021/003326.

(Continued)

*Primary Examiner* — Ricky D Shafer
(74) *Attorney, Agent, or Firm* — KENJA IP LAW PC

(57) ABSTRACT

An identification medium including a light reflection layer and a patterned phase difference layer, wherein the light reflection layer is a layer that reflects incident light as circularly polarized light or linearly polarized light, and the patterned phase difference layer is a layer that includes an area having a phase difference, and is a layer provided in the identification medium so that the area having a phase difference occupies a partial area of a display surface of the identification medium. Also provided are an article including the identification medium, and a method for using the identification medium wherein, in observation of the reflected light, a linear polarization component or a circular polarization component of the reflected light is selectively observed, or linearly polarized light, circularly polarized light, or elliptically polarized light is made incident as the incident light.

17 Claims, 8 Drawing Sheets

(58) Field of Classification Search
USPC ............ 359/486.01, 486.02, 487.02, 489.07, 359/489.15
See application file for complete search history.

(56) References Cited

U.S. PATENT DOCUMENTS

| | | | | |
|---|---|---|---|---|
| 5,548,427 | A * | 8/1996 | May | G02F 1/31 359/489.07 |
| 6,217,792 | B1 | 4/2001 | Parri et al. | |
| 6,468,444 | B1 | 10/2002 | Meyer et al. | |
| 6,496,287 | B1 * | 12/2002 | Seiberle | B42D 25/00 359/2 |
| 6,806,930 | B2 * | 10/2004 | Moia | G06K 19/14 359/2 |
| 6,879,362 | B2 | 4/2005 | Kawabata | |
| 7,375,888 | B2 * | 5/2008 | Moia | B42D 25/00 359/489.06 |
| 7,391,546 | B2 * | 6/2008 | Hoshino | B42D 25/364 349/97 |
| 8,976,449 | B2 * | 3/2015 | Ida | B42D 25/391 359/2 |
| 2003/0035191 | A1 * | 2/2003 | Moia | G06K 19/14 428/1.31 |
| 2003/0178609 | A1 | 9/2003 | Hammond-Smith et al. | |
| 2003/0179363 | A1 * | 9/2003 | Wang | B42D 25/29 356/71 |
| 2004/0252259 | A1 * | 12/2004 | Schadt | G02B 5/3083 349/98 |
| 2008/0054621 | A1 | 3/2008 | Burchard et al. | |
| 2009/0128772 | A1 | 5/2009 | Hoshino et al. | |
| 2010/0119738 | A1 | 5/2010 | Suzuki et al. | |
| 2010/0123943 | A1 | 5/2010 | Umemoto et al. | |
| 2012/0236292 | A1 | 9/2012 | Hoshino et al. | |
| 2014/0103633 | A1 * | 4/2014 | Jiang | B42D 25/364 283/85 |
| 2014/0192286 | A1 | 7/2014 | Tasaka et al. | |
| 2015/0069128 | A1 | 3/2015 | Hoshino et al. | |
| 2017/0157972 | A1 | 6/2017 | Ooishi | |
| 2018/0093520 | A1 | 4/2018 | Martz et al. | |
| 2018/0237695 | A1 | 8/2018 | Kusano | |
| 2019/0079232 | A1 * | 3/2019 | Saito | H10K 59/50 |
| 2019/0094626 | A1 * | 3/2019 | Yanai | G02B 5/30 |
| 2021/0198576 | A1 | 7/2021 | Aimatsu | |
| 2023/0076172 | A1 | 3/2023 | Fujiwara | |

FOREIGN PATENT DOCUMENTS

| | | | |
|---|---|---|---|
| EP | 0900509 | A2 | 3/1999 |
| EP | 2006750 | A2 | 12/2008 |
| JP | H0672962 | A | 3/1994 |
| JP | H09183287 | A | 7/1997 |
| JP | 2000290315 | A | 10/2000 |
| JP | 2003066214 | A | 3/2003 |
| JP | 2003279750 | A | 10/2003 |
| JP | 2003313187 | A | 11/2003 |
| JP | 2003342219 | A | 12/2003 |
| JP | 2004115414 | A | 4/2004 |
| JP | 3689237 | B2 | 8/2005 |
| JP | 2005289881 | A | 10/2005 |
| JP | 2007001130 | A | 1/2007 |
| JP | 2007121388 | A | 5/2007 |
| JP | 2007176870 | A | 7/2007 |
| JP | 2007279129 | A | 10/2007 |
| JP | 2007334206 | A | 12/2007 |
| JP | 2008139509 | A | 6/2008 |
| JP | 2008139510 | A | 6/2008 |
| JP | 2009134297 | A | 6/2009 |
| JP | 2010113249 | A | 5/2010 |
| JP | 2010120230 | A | 6/2010 |
| JP | 2010134333 | A | 6/2010 |
| JP | 2010196005 | A | 9/2010 |
| JP | 2010221650 | A | 10/2010 |
| JP | 2012215762 | A | 11/2012 |
| JP | 2013076052 | A | 4/2013 |
| JP | 5229056 | B2 | 7/2013 |
| JP | 2014052527 | A | 3/2014 |
| JP | 2014174471 | A | 9/2014 |
| JP | 2014174472 | A | 9/2014 |
| JP | 2016004487 | A | 1/2016 |
| JP | 5915838 | B2 | 5/2016 |
| JP | 2017215435 | A | 12/2017 |
| JP | 2018517175 | A | 6/2018 |
| WO | 9800428 | A1 | 1/1998 |
| WO | 2005059597 | A2 | 6/2005 |
| WO | 2009041756 | A1 | 4/2009 |
| WO | 2011065242 | A1 | 6/2011 |
| WO | 2016188937 | A1 | 12/2016 |
| WO | 2017018468 | A1 | 2/2017 |
| WO | 2017110225 | A1 | 6/2017 |

OTHER PUBLICATIONS

Anonymous, Technical Information Paliocolor LC 242 and LC 756, Published on Sep. 2002, from URL: http://www.elecs-korea.com/board/file/1116949999.pdf, retrieved on Jan. 27, 2022.

Apr. 11, 2025, Office Action issued by the United States Patent and Trademark Office in the U.S. Appl. No. 17/059,208.

Aug. 20, 2019, International Search Report issued in the International Patent Application No. PCT/JP2019/021255.

Dec. 1, 2020, International Preliminary Report on Patentability issued in the International Patent Application No. PCT/JP2019/021255.

Feb. 4, 2022, the Extended European Search Report issued by the European Patent Office in the corresponding European Patent Application No. 19811489.4.

Jan. 24, 2025, Office Action issued by the United States Patent and Trademark Office in the U.S. Appl. No. 17/059,208.

Mar. 28, 2024, Office Action issued by the United States Patent and Trademark Office in the U.S. Appl. No. 17/059,208.

Nov. 22, 2024, Office Action issued by the United States Patent and Trademark Office in the U.S. Appl. No. 17/059,208.

Oct. 24, 2023, Office Action issued by the United States Patent and Trademark Office in the U.S. Appl. No. 17/059,208.

Oct. 9, 2024, Office Action issued by the United States Patent and Trademark Office in the U.S. Appl. No. 17/059,208.

Sep. 19, 2023, Office Action issued by the United States Patent and Trademark Office in the U.S. Appl. No. 17/059,208.

Jul. 28, 2022, International Preliminary Report on Patentability issued in the International Patent Application No. PCT/JP2021/003326.

Jan. 24, 2024, the Extended European Search Report issued by the European Patent Office in the corresponding European Patent Application No. 21746934.5.

"Target." Merriam-Webster.com Dictionary, Merriam-Webster, https://www.merriam-webster.com/dictionary/target. Accessed Oct. 2, 2025. (Year: 2025).

Oct. 7, 2025, Office Action issued by the United States Patent and Trademark Office in the U.S. Appl. No. 17/059,208.

* cited by examiner

IDENTIFICATION MEDIUM, ARTICLE, AND IDENTIFICATION MEDIUM USE METHOD

FIELD

The present invention relates to an identification medium, an article, and a method for using an identification medium.

BACKGROUND

As a general practice, an identification medium is provided to an article for facilitating determination of whether or not the article is an authentic article. The identification medium is required to have anti-counterfeit performance and an identification function. The anti-counterfeit performance of the identification medium as referred to herein is performance that prevents the identification medium from being easily copied by means of a general technique such as printing. The identification function of the identification medium is a function that can allow an authentic identification medium to be distinguished by some means with high reliability from a counterfeit identification medium deceptively produced by means of a general technique.

In many cases, determination of authenticity of an identification medium is performed by observation through a special determination tool including an optical member such as a circular polarizer and a linear polarizer (for example, Patent Literatures 1 to 3). On the other hand, some identification media can be subjected to determination by observation with the naked eye without the need for a special determination tool. For example, there is an identification medium, such as a so-called hologram, that can be subjected to determination on the basis of whether or not a stereoscopic image of a pattern shape on the identification medium can be viewed (for example, Patent Literature 4).

CITATION LIST

Patent Literature

Patent Literature 1: Japanese Patent Application Laid-Open No. 2010-221650 A
Patent Literature 2: Japanese Patent Application Laid-Open No. 2010-113249 A (Corresponding publication: specification of U.S. Patent Application Publication No. 2010/119738)
Patent Literature 3: International Publication No. 2005/059597
Patent Literature 4: Japanese Patent No. 5915838 B

SUMMARY

Technical Problem

As to an identification medium that requires a special determination tool for determination of authenticity, the persons who perform the determination are limited. That is, only special identifiers, such as customs staff, that possess special determination tools can perform the determination, whereas general article users who buy, sell, possess, or use articles cannot perform the determination since the users do not possess such special determination tools. In addition, determination of authenticity for an identification medium in Patent Literatures 1 and 2 requires a special operation of bringing a determination tool close to the identification medium.

As to an identification medium that can be subjected to determination with a so-called hologram that does not require a special determination tool, while the persons who perform the determination are less limited, anti-counterfeit performance may be insufficient since an identification medium that can provide a relatively similar effect can be produced by means of a hologram technique that has already been commonly used. In a case of employing a method of observing a hologram through a special determination tool, a configuration with further improved anti-counterfeit performance can be achieved. However, in this case, the persons who perform the determination are limited as in the aforementioned case.

Therefore, an object of the present invention is to provide an identification medium that has high anti-counterfeit performance and that can provide an identification function without the need for a special determination tool, an article including an identification medium, and a method for determining authenticity.

Solution to Problem

In their study to solve the aforementioned problem, the present inventors have conceived of configuring an identification medium that can provide an identification function by using a general tool, such as polarized sunglasses and a device such as a liquid crystal display device that emits polarized light, in its normal use mode. As a result of further study based on the idea, the present inventors have arrived at the present invention upon discovering that, in a case where a specific identification medium is constituted, the identification function thereof can be used by using the general tool, and that favorable anti-counterfeit performance can also be obtained.

That is, the Present Invention Includes the Following.

(1) An identification medium comprising a light reflection layer and a patterned phase difference layer, wherein
the light reflection layer is a layer that reflects incident light as circularly polarized light or linearly polarized light, and
the patterned phase difference layer is a layer that includes an area having a phase difference, and is a layer provided in the identification medium so that the area having a phase difference occupies a partial area of a display surface of the identification medium.

(2) The identification medium according to (1), wherein the patterned phase difference layer is provided at a position on a side closer to a viewing side than the light reflection layer.

(3) The identification medium according to (1) or (2), wherein the light reflection layer is a reflection-type circular polarizer or a reflection-type linear polarizer.

(4) The identification medium according to ((3), wherein the light reflection layer is the reflection-type circular polarizer.

(5) The identification medium according to any one of (1) to (4), wherein the patterned phase difference layer includes, as the area having a phase difference, an area that functions as a λ/4 wave plate or a λ/2 wave plate.

(6) The identification medium according to any one of (1) to (5), comprising one or more single patterned phase difference layers as the patterned phase difference layer, the single patterned phase difference layer consisting of a single area that has a smaller size than that of the display surface of the identification medium, and has a certain phase difference.

(7) The identification medium according to any one of (1) to (6), comprising a plurality of areas having irregularly different directions of slow axes as the area having a phase difference.

(8) The identification medium according to any one of (1) to (7), wherein the light reflection layer is a cut piece of a material having cholesteric regularity.

(9) The identification medium according to any one of (1) to (8), wherein the light reflection layer include two or more areas giving different polarization states to reflected light.

(10) The identification medium according to any one of (1) to (9), wherein a reflectance ratio of the unpolarized light having been incident on one or more areas of the light reflection layer and reflected by the light reflection layer is 35 to 50% at all wavelengths in a wavelength region of 420 nm to 650 nm.

(11) The identification medium according to any one of (1) to (10), further comprising a light absorption layer on a side of the light reflection layer opposite to a viewing side.

(12) The identification medium according to any one of (1) to (11), further comprising a diffusion layer provided at a position on a side closer to a viewing side than the patterned phase difference layer.

(13) The identification medium according to any one of (1) to (12), further comprising a transparent resin member, in which part or all members other than the transparent resin member are embedded.

(14) The identification medium according to any one of (1) to (13), further comprising a mounting member for attachment to an article.

(15) An article comprising the identification medium according to any one of (1) to (14).

(16) The article according to (15), further comprising a polarizer viewer.

(17) A method for using the identification medium according to any one of (1) to (14), comprising:
  - causing incidence of incident light on the display surface of the identification medium and reflection of the incident light by the light reflection layer to convert the incident light into reflected light, and observing the reflected light, wherein
  - unpolarized light is made incident as the incident light, and in observation of the reflected light, a linear polarization component or a circular polarization component of the reflected light is selectively observed.

(18) The method for using the identification medium according to (17), wherein the selective observation is performed by visually observing the reflected light via a linear polarizer being separated away from the identification medium.

(19) The method for using the identification medium according to (18), wherein the linear polarizer is polarized sunglasses.

(20) A method for using the identification medium according to any one of (1) to (14), comprising:
  - causing incidence of incident light on the display surface of the identification medium and reflection of the incident light by the light reflection layer to convert the incident light into reflected light, and observing the reflected light, wherein
  - linearly polarized light, circularly polarized light, or elliptically polarized light is made incident as the incident light.

Advantageous Effects of Invention

According to the present invention, there can be provided an identification medium, an article including the identification medium, and a method for determining authenticity which have high anti-counterfeit performance and which can provide an identification function without the need for a special determination tool.

DESCRIPTION OF EMBODIMENTS

Figure 1:
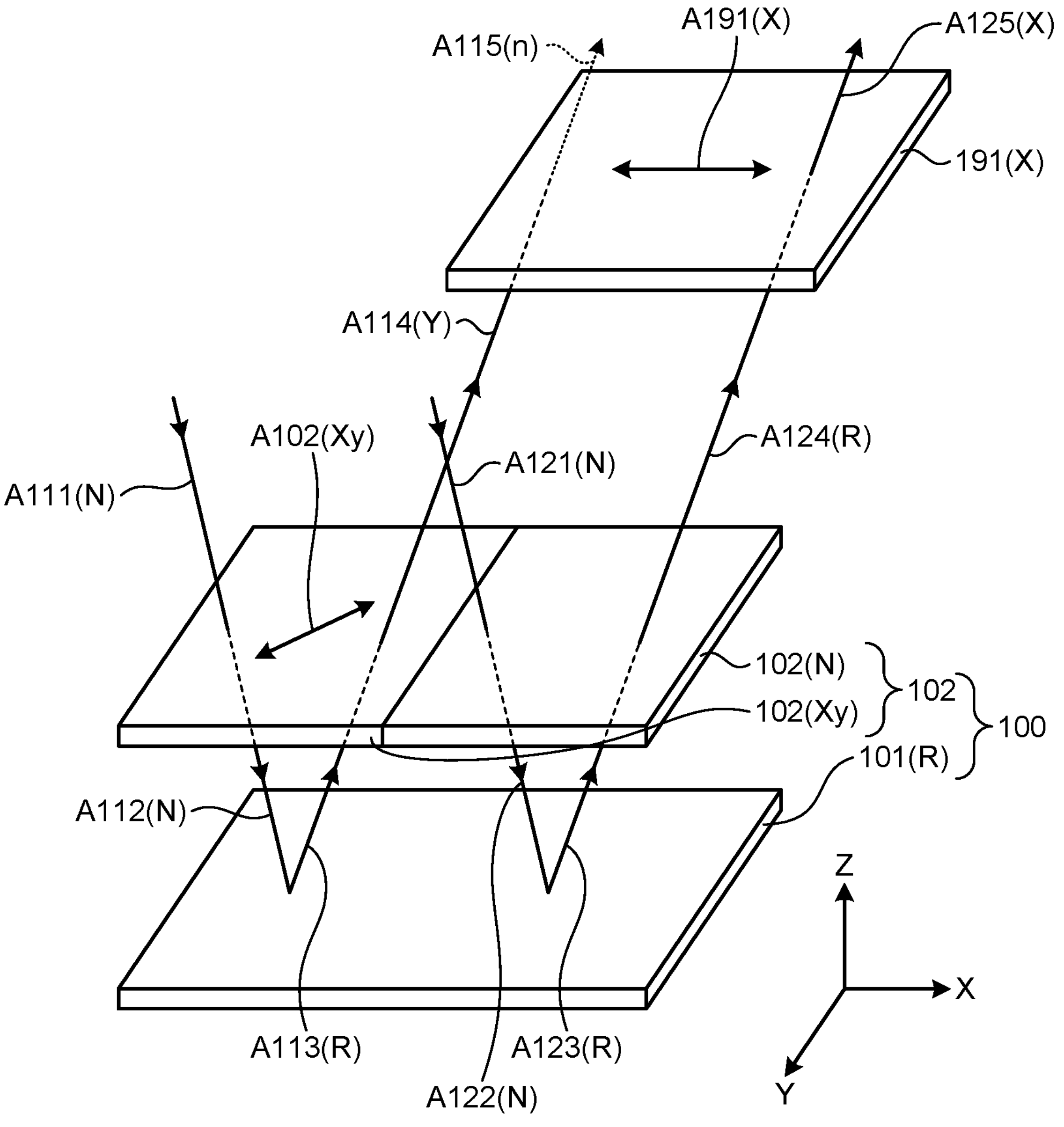
FIG. 1 is an exploded perspective view schematically illustrating an example of an identification medium of the present invention and a method for using the same.

Hereinafter, the present invention will be described in detail with reference to examples and embodiments. However, the present invention is not limited to the examples and embodiments described hereinafter, and may be freely modified for implementation without departing from the scope of claims of the present invention and the scope of their equivalents.

In the following description, the term "(meth)acrylic group" is a term encompassing an "acrylic group", a "methacrylic group", and a combination of these, unless otherwise specified.

In the following description, an in-plane retardation Re of a certain layer is a value represented by Re=(nx−ny)×d unless otherwise specified. Herein, nx represents a refractive index in a direction in which the maximum refractive index is given among directions perpendicular to the thickness direction of the layer (in-plane directions), ny represents a refractive index in a direction, among the above-mentioned in-plane directions of the layer, perpendicular to the direction giving nx, and d represents the thickness of the layer. The measurement wavelength of retardation is 590 nm unless otherwise specified. In addition, Re measured at a certain wavelength (unit: nm) is indicated by the notation accompanied by a number such as Re(450). For example, Re(450) indicates Re for light with a wavelength of 450 nm. The in-plane retardation Re may be measured using a phase difference meter ("Axoscan" manufactured by Axometrics, Inc).

In the following description, a direction of a slow axis of a certain layer refers to the direction of the slow axis in the in-plane direction unless otherwise specified.

In the following description, a direction of a member being "parallel" and "perpendicular" may allow an error within the range of not impairing the advantageous effects of the present invention, for example, within a range of ±4°, preferably ±3°, more preferably ±1°, unless otherwise specified.

In the following description, for convenience of description, "clockwise circularly polarized light" and "counterclockwise circularly polarized light" are defined on the basis of a rotating direction of circularly polarized light in a case where a light-emitting destination is observed from a light-emitting root. That is, in a case where a light-emitting destination is observed from a light-emitting root, polarized light that rotates in a clockwise polarization direction as light advances is defined as clockwise circularly polarized light while polarized light that rotates in an opposite direction thereof is defined as counterclockwise circularly polarized light.

In the following illustration in the drawings and description of the drawings, the following signs are used for convenience to facilitate understanding. In the following description of signs, the directions are on the basis of the directions illustrated in FIGS. 1 to 10 and the directions referred to in the description regarding these drawings. A vibration direction of polarized light means a vibration direction of the electric field.

(N): unpolarized light or an isotropic layer that transmits light (X): linearly polarized light whose vibration direction is in the direction of the X-axis, or a polarizer having a transmission axis in the direction of the X-axis (Y): linearly polarized light whose vibration direction is in the direction of the Y-axis, or a polarizer having a transmission axis in the direction of the Y-axis (L): counterclockwise circularly polarized light, or a counterclockwise reflection-type circular polarizer (that is, a reflection-type circular polarizer that selectively reflects a counterclockwise circular polarization component of incident light)

(R): clockwise circularly polarized light, or a clockwise reflection-type circular polarizer (that is, a reflection-type circular polarizer that selectively reflects a clockwise circular polarization component of incident light)

(n): no light exists (XY): an XY direction, or a phase difference layer having a slow axis in the XY direction (Xy): an Xy direction, or a phase difference layer having a slow axis in the Xy direction In the following description, an identification medium will be described in a state of being placed horizontally with the display surface thereof facing upward unless otherwise stated. Therefore, a side on which the identification medium is visually recognized is referred to simply as an "upper" side while the opposite side thereof is referred to as a "lower" side in some cases. For example, among one surface and the other surface of a certain layer, the surface on a side closer to the display surface of the identification medium is expressed as an "upper-side" surface in some cases. Also, a direction perpendicular to the "upper" and "lower" directions is referred to as a "horizontal" direction in some cases.

Identification Medium: Embodiment 1

The identification medium of the present invention includes a light reflection layer and a patterned phase difference layer.

Figure 2:
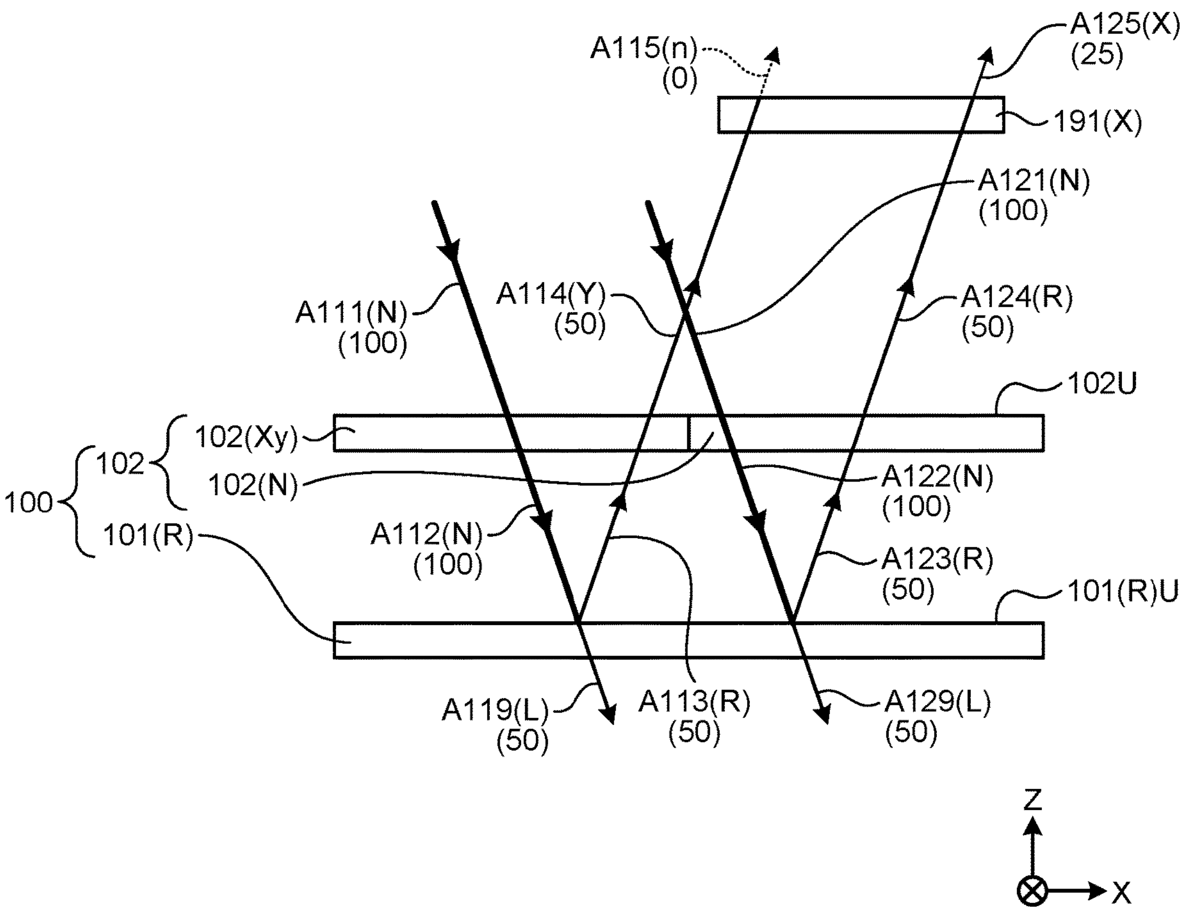
FIG. 2 is an exploded side view schematically illustrating an example of an identification medium of the present invention and a method for using the same.

FIGS. 1 and 2 are an exploded perspective view and an exploded side view, respectively, schematically illustrating an example of the identification medium of the present invention and an example of the method for using the same. Although, in FIGS. 1 to 2 and 4 to 10, components of the identification medium are illustrated in a separated state for explanation of optical functions, in the actual identification medium, these components can be in contact with one another directly or via another layer. In FIGS. 1 and 2, an identification medium 100 includes a light reflection layer 101(R) and a patterned phase difference layer 102. In this example, the entire area of an upper surface 101(R)U of the light reflection layer 101(R) is an area corresponding to a display surface and the patterned phase difference layer 102 is provided occupying the entire area of the upper surface. As for the patterned phase difference layer 102, only a part thereof is a layer 102(Xy) functioning as a λ/4 wave plate, and the other part is an isotropic layer 102(N).

The patterned phase difference layer is usually provided at a position on a side closer to the viewing side than the light reflection layer. Therefore, the display surface of the identification medium is usually a surface of the identification medium on a side with the patterned phase difference layer. In the identification medium 100 in the example in FIGS. 1 and 2, an upper-side surface 102U of the patterned phase difference layer 102 functions as the display surface. That is, part of light incident on the surface 102U of the identification medium 100 is reflected inside the identification medium 100 and is emitted from the surface 102U, and an observer observes the light, to express a function as the identification medium.

For convenience of description, in FIGS. 1 to 10, directions in space are expressed by common three-dimensional coordinate axes. In coordinate axes illustrated by the arrows X, Y, and Z, a direction parallel to the arrow X, a direction parallel to the arrow Y, and a direction parallel to the arrow Z are referred to simply as a direction of an X-axis, a direction of a Y-axis, and a direction of a Z-axis, respectively. In FIGS. 1 to 2 and 4 to 10, an identification medium

100 or 200 is positioned so that the display surface thereof may be in a direction parallel to an XY plane.

Figure 3:
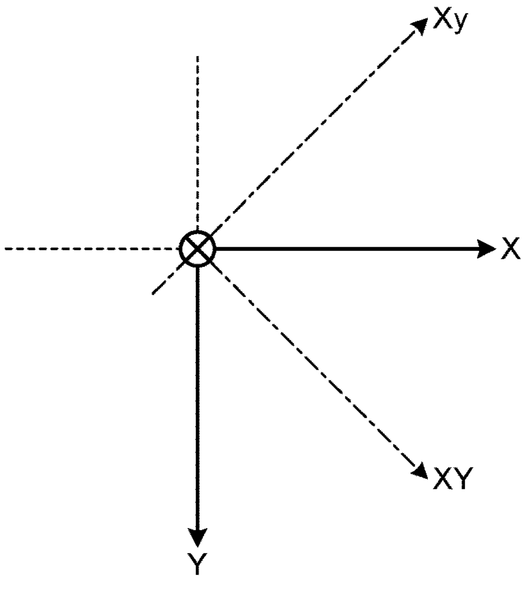
FIG. 3 is a top view illustrating a state where coordinate axes illustrated in FIG. 1 are observed in a direction of a Z-axis.

FIG. 3 is a top view illustrating a state where the coordinate axes illustrated in FIG. 1 are observed in the direction of the Z-axis. Among in-plane directions in the XY plane, a direction at an angle of 45° to the arrow X and the arrow Y (that is, a direction parallel to the arrow XY in FIG. 3) is referred to as an XY direction. Also, a direction at an angle of 45° to the arrow X and at an angle of 135° to the arrow Y (that is, a direction parallel to the arrow Xy in FIG. 3) is referred to as an Xy direction.

(Summary of Optical Property of Light Reflection Layer)

The light reflection layer is a layer that reflects incident light as circularly polarized light or linearly polarized light. Specifically, the light reflection layer is a layer that, in a case where unpolarized light containing various polarization components is incident thereon, reflects a certain polarization component thereof as circularly polarized light or linearly polarized light. The light reflection layer is usually a reflection-type polarizer. That is, the light reflection layer transmits part or the entirety of a polarization component having a certain wavelength of incident light and reflects part or the entirety of the other polarization components. As the light reflection layer, a reflection-type circular polarizer or a reflection-type linear polarizer may be used.

The reflection-type circular polarizer is an optical element that transmits one of a clockwise circular polarization component and a counterclockwise circular polarization component of incident light having a certain wavelength and reflects the other. The reflection-type linear polarizer is an optical element that transmits one of a certain linear polarization component and a linear polarization component perpendicular to the component of incident light having a certain wavelength and reflects the other.

In the example in FIGS. 1 and 2, a clockwise reflection-type circular polarizer (that is, a reflection-type circular polarizer that selectively reflects a clockwise circular polarization component of incident light) is used as the light reflection layer 101(R). More specific description of examples of the light reflection layer and materials constituting these examples will separately be discussed later.

(Summary of Optical Property of Patterned Phase Difference Layer)

The patterned phase difference layer is a layer that includes an area having a phase difference, and is a layer provided in the identification medium so that the area having a phase difference may occupy a partial area of the display surface of the identification medium. In the following description, a portion of the patterned phase difference layer corresponding to the area having a phase difference is simply referred to as a "phase difference layer" in some cases.

On the display surface, an area other than the area occupied by a certain phase difference layer may be an area occupied by another phase difference layer having a different phase difference, an area occupied by an isotropic layer having no phase difference, or an area where neither of them exists.

Examples of the area having a phase difference may include an area that functions as a λ/4 wave plate and an area that functions as a λ/2 wave plate. The area that functions as a λ/4 wave plate is an area in which, at at least one wavelength λ in a wavelength range in which the light reflection layer functions, an in-plane retardation Re thereof is λ/4 or a value close to λ/4. For example, an area in which Re is ((λ/4)×0.6) nm to ((λ/4)×1.4) nm, preferably an area in which Re is ((λ/4)×0.8) nm to ((λ/4)×1.2) nm, may be used as the area having a phase difference. Similarly, the area that functions as a λ/2 wave plate is an area in which an in-plane retardation Re thereof is λ/2 or a value close to λ/2, such as an area in which Re is ((λ/2)×0.6) nm to ((λ/2)×1.4) nm, preferably an area in which Re is ((λ/2)×0.8) nm to ((λ/2)×1.2) nm.

In the example in FIGS. 1 and 2, the patterned phase difference layer 102 is a combination of the layer 102 (Xy) functioning as a λ/4 wave plate and the isotropic layer 102(N) disposed in the horizontal direction. Therefore, an area occupied by the layer 102(Xy) occupies a partial area of the display surface of the identification medium 100. The layer 102(Xy) has a slow axis in the Xy direction, that is, a direction indicated by the arrow A102 (Xy). More specific description of examples of the patterned phase difference layer and materials constituting these examples will separately be discussed later.

(Method for Using Identification Medium of Embodiment 1: No. 1)

In a method for using an identification medium of the present invention, incident light is made incident on the display surface of the identification medium, and reflection of the incident light is caused by the light reflection layer to convert the incident light into reflected light, and the reflected light is observed.

Examples of light to be incident on the identification medium may include unpolarized light, linearly polarized light, circularly polarized light, and elliptically polarized light. In a case where light to be incident is unpolarized light, observation of reflected light may be carried out by selectively observing a linear polarization component or a circular polarization component of the reflected light, whereby the identification medium can be used.

As unpolarized light to be incident, general environmental light such as sunlight and indoor illumination light may be used.

Selective observation of the linear polarization component in the reflected light may be performed by visually observing the reflected light via an observational linear polarizer. Selective observation of the circular polarization component in the reflected light may be performed by visually observing the reflected light via an observational circular polarizer. To avoid hindrance to incidence of environmental light, the observational linear polarizer and the observational circular polarizer may be usually used in a state of being separated away from the identification medium. The lower limit of the distance from the identification medium may usually be 100 mm or more although, if necessary, the lower limit may be adjusted in accordance with the sizes or the like of the identification medium and the observational linear polarizer. On the other hand, the upper limit of the distance from the identification medium may usually be 30 μm or less although, if necessary, the upper limit can be adjusted as long as the reflected light of the identification medium can be observed.

The observational linear polarizer used at a position separated away from the identification medium in this manner may be a dedicated article to the use method of the present invention but may be a general linear polarizer for use in other applications. For example, since many of commercially available polarized sunglasses can function as a linear polarizer, such commercially available polarized sunglasses may be used as the observational linear polarizer. Examples of the observational circular polarizer may include a circular polarizer constituted by a combination of a linear polarizer and a phase difference film and a circular polarizer including a layer made of a cholesteric material (for example, those described in International Publication No. 2020/121791).

FIGS. 1 and 2 illustrate an example in which incident light on the identification medium 100 is unpolarized light, and in which reflected light from the identification medium 100 is observed via an observational linear polarizer 191(X). In this example, the observational linear polarizer 191(X) is a polarizer positioned at a relative angle to the identification medium 100 so that the observational linear polarizer 191 (X) has a transmission axis in the direction of the X-axis, that is, a direction indicated by the arrow A191(X). Therefore, in this example, the slow axis of the layer 102(Xy) is inclined by 45° counterclockwise with respect to the transmission axis of the observational linear polarizer 191(X). That is, in a case where the observational linear polarizer 191(X) and the identification medium 100 are observed from the visually recognized side with setting the direction of the transmission axis of the observational linear polarizer 191 (X) as a reference, the slow axis of the layer 102 (Xy) is inclined by 45° counterclockwise with respect to the reference. In the following description with reference to FIGS. 1 to 10, "clockwise" and "counterclockwise" have the same meanings as those described above.

The values in parentheses in FIGS. 2 and 4 to 10 are theoretical values for brightness of light at respective levels in a case where brightness of incident light is set to 100. Herein, the theoretical value is a value in a case where separation of polarized light by means of a polarizer is completely performed (in the example in FIG. 2, a state where, of incident light on the light reflection layer 101(R), a clockwise circular polarization component is completely reflected, where a counterclockwise circular polarization component is completely transmitted, where, of incident light on the observational linear polarizer 191(X), a linear polarization component in the direction of the X-axis is completely transmitted, and where the other linear polarization component is completely absorbed or reflected and shielded), and where no light is absorbed in the patterned phase difference layer.

In the example of using the identification medium 100 illustrated in FIGS. 1 and 2, incident light A111(N) and A121(N), which are unpolarized light, are incident on the layer 102(Xy) functioning as a λ/4 wave plate and the isotropic layer 102(N) of the patterned phase difference layer 102, respectively.

The incident light A111(N) is transmitted through the layer 102(Xy), is emitted downward as light A112(N) that is unpolarized light, and reaches the upper surface 101(R)U of the light reflection layer 101(R). Since the light reflection layer 101(R) is a clockwise reflection-type circular polarizer, the clockwise circular polarization component of the light A112(N) is reflected on or in the light reflection layer 101(R) and becomes reflected light A113(R), and the theoretical value for the brightness thereof is half of that of the incident light. On the other hand, the counterclockwise circular polarization component of the light A112(N) is transmitted through the light reflection layer 101(R) and becomes transmitted light A119(L).

The light A113(R) is transmitted through the layer 102 (Xy) again and is emitted as light A114(Y) from the display surface of the identification medium 100. Since the light A113(R) is clockwise circularly polarized light, and the layer 102(Xy) is a λ/4 wave plate having a slow axis in the XY direction, the light A114(Y) becomes linearly polarized light whose polarization direction is in the direction of the Y-axis, and the theoretical value for the brightness thereof is equal to that for the brightness of the light A113(R).

When the emitted light A114(Y) is incident on the observational linear polarizer 191(X), the entirety of the light A114(Y) is shielded, and the theoretical value for the brightness of emitted light A115(*n*) from the observational linear polarizer 191(X) is zero since the polarization vibration direction of the light A114(Y) and the transmission axis of the observational linear polarizer 191(X) are orthogonal to each other.

On the other hand, the incident light A121(N) is transmitted through the layer 102(N), is emitted downward as light A122(N) that is unpolarized light, and reaches the upper surface 101(R)U of the light reflection layer 101(R). The clockwise circular polarization component of the light A122(N) is reflected and becomes reflected light A123(R), and the theoretical value for the brightness thereof is half of that of the incident light. On the other hand, the counterclockwise circular polarization component of the light A122 (N) is transmitted through the light reflection layer 101(R) and becomes transmitted light A129(L).

The light A123(R) is transmitted through the layer 102(N) again and is emitted as light A124(R) from the display surface of the identification medium 100. The theoretical value for the brightness of the light A124(R) is equal to that for the brightness of the light A123(R).

When the emitted light A124(R) is incident on the observational linear polarizer 191(X), only the linear polarization component whose vibration direction is in the direction of the X-axis, of the light A124(R), is emitted as emitted light A125(X) from the observational linear polarizer 191(X). The theoretical value for the brightness of the emitted light A125(X) is half of that of the light A124(R).

As a result, in a case where the identification medium 100 in a state of receiving unpolarized light is observed via the observational linear polarizer 191(X), the area occupied by the layer 102(Xy) is observed as a relatively dark area with no reflected light while the area occupied by the layer 102(N) is observed as a relatively bright area with reflected light which is ¼ of the incident light in terms of brightness.

Figure 4:
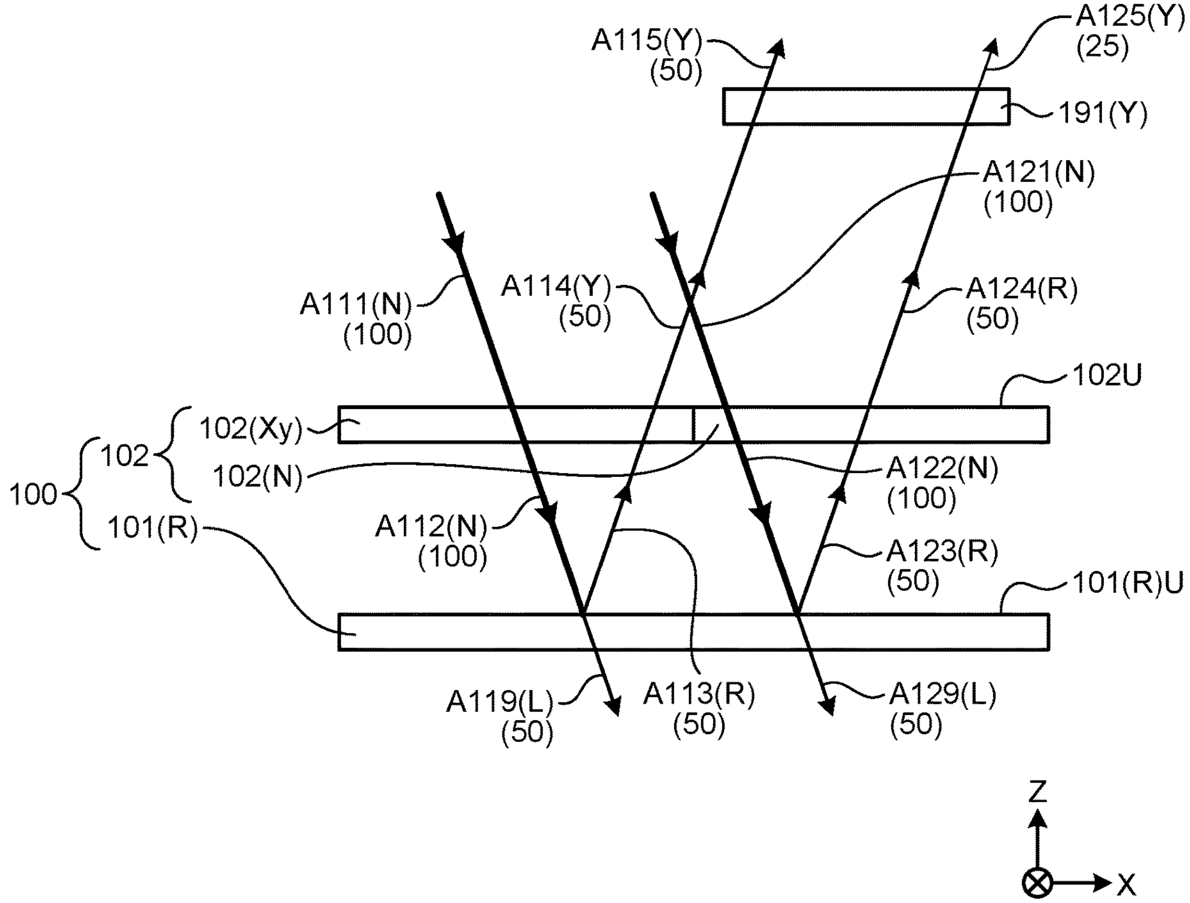
FIG. 4 is an exploded side view schematically illustrating an example of the method for using an identification medium of the present invention in a case where the relative angular relationship between the identification medium and the observational linear polarizer is changed from that in the example in FIGS. 1 and 2.

FIG. 4 is an exploded side view schematically illustrating an example of the method for using an identification medium of the present invention in a case where the relative angular relationship between the identification medium and the observational linear polarizer is changed from that in the example in FIGS. 1 and 2. FIG. 4 illustrates a case where the angles of the identification medium 100 with respect to the coordinate axes are fixed, and where the angles of the observational linear polarizer with respect to the X-axis and the Y-axis are changed. However, in actual use, such a change in the relative angular relationship may be done by movement of the identification medium, movement of the observational linear polarizer, replacement of the observational linear polarizer, or a combination of these two or more ways.

The example in FIG. 4 is a changed example of using an observational linear polarizer 191(Y) as an observational linear polarizer as a result of the change in the relative angular relationship. The observational linear polarizer 191 (Y) is a polarizer positioned at a relative angle to the identification medium 100 so that the observational linear polarizer 191(Y) has a transmission axis in the direction of the Y-axis. Therefore, in this example, the slow axis of the layer 102(Xy) is inclined by 45° clockwise with respect to the transmission axis of the observational linear polarizer 191(Y).

In the example of using the identification medium 100 illustrated in FIG. 4, the incident light A111(N) and A121 (N), which are unpolarized light, are incident on the layer 102 (Xy) functioning as a λ/4 wave plate and the isotropic layer 102(N) of the patterned phase difference layer 102, respectively, and part of each of them is emitted as the light A114(Y) and A124(R) from the display surface of the identification medium 100. The light paths so far are the same as those in the example in FIGS. 1 and 2.

When the emitted light A114(Y) is incident on the observational linear polarizer 191(Y), the entirety of the light A114(Y) is transmitted and is emitted as emitted light A115(Y) from the observational linear polarizer 191(Y) since the polarization vibration direction of the light A114 (Y) and the transmission axis of the observational linear polarizer 191(Y) are parallel to each other. The theoretical value for the brightness of the emitted light A115(Y) is equal to the value for the brightness of the light A114(Y).

On the other hand, when the emitted light A124(R) is incident on the observational linear polarizer 191(Y), only the linear polarization component whose vibration direction is in the direction of the Y-axis, of the light A124(R), is emitted as emitted light A125(Y) from the observational linear polarizer 191(Y). The theoretical value for the brightness of the emitted light A125(Y) is half of that of the light A124(R).

As a result, in a case where the identification medium 100 in a state of receiving unpolarized light is observed via the observational linear polarizer 191(Y), the area occupied by the layer 102(Xy) is observed as a relatively bright area with reflected light which is ½ of the incident light in terms of brightness. On the other hand, the area occupied by the layer 102(N) is observed as an area with reflected light which is ¼ of the incident light in terms of brightness. Although the brightness of this layer 102(N) does not differ from that in the case illustrated in FIGS. 1 and 2, in this example, the layer 102(N) is observed as a relatively darker area than the area occupied by the layer 102 (Xy).

Accordingly, by changing the relative angular relationship between the identification medium and the observational linear polarizer from that in the example in FIGS. 1 and 2 to that in the example in FIG. 4, the relative brightness among the plurality of areas changes in a case of observation via the observational linear polarizer. More specifically, when the orientation of the observational linear polarizer is changed from the state of the observational linear polarizer 191(X) in FIGS. 1 and 2 by rotating the polarizer about a certain axis parallel to the direction of the Z-axis, the relative brightness of the area occupied by the layer 102(Xy) becomes higher along with the increase of the rotation angle, and the relative brightness becomes maximum when the orientation of the observational linear polarizer reaches the state of the observational linear polarizer 191(Y) in FIG. 4.

In a case where such a change in brightness is achieved in the entire visible area or in as nearly broad a wavelength range as the entire visible area, the change in brightness can be observed as a change from a dark black state to a bright silver state. In a case where the change in brightness is achieved only in a partial wavelength range of the visible area, the change in brightness can be observed as a color change corresponding to the wavelength range in which the change occurs.

On the other hand, in a case where the identification medium 100 in a state of receiving unpolarized light is observed not via the observational linear polarizer, the observer observes the emitted light A114(Y) and A124(R). The emitted light A114(Y) and A124(R) have different polarization states but the same brightness. Since the difference between the polarization states cannot be recognized in human vision, the observer cannot recognize the difference. In addition, even when the relative angular relationship between the identification medium 100 and the observer changes, the observer cannot recognize the change based on the difference between the polarization states.

In the use method in this example, the identification medium of the present invention can provide a special effect wherein a relative brightness change is observed only in a case where the identification medium is observed via the observational linear polarizer. Such a special effect cannot be obtained from a copied article easily obtained by a general technique such as printing. Therefore, the identification medium of the present invention exerts excellent anti-counterfeit performance in such use.

With such a relative brightness change, an image such as a character and a graphic can be displayed on the display surface. Such an image that is not observed in usual observation and is observed only in specific observation of the identification medium is referred to as "a latent image" of the identification medium.

In addition, such a special effect is obtained in a case where incident light is unpolarized light, and where a linear polarization component in reflected light is selectively observed. Such observation can be achieved by visually observing the reflected light via the observational linear polarizer serving as a determination tool in a state where incident light is environmental light, and where the identification medium and the observational linear polarizer are separated away from each other. As the observational linear polarizer, a general polarizer such as commercially available polarized sunglasses may be used. Therefore, such observation can be performed without the need for a special operation of bringing the determination tool close to the identification medium, and as the determination tool, one that is relatively easily available may be used. For example, identification can be achieved by an easy operation of visually observing the identification medium placed away from an observer in a state of wearing polarized sunglasses. Therefore, the identification medium of the present invention exerts a high identification function in such use.

In the examples illustrated in FIGS. 1 and 2 and FIG. 4, observation in a state where the identification medium and the observational linear polarizer are separated away from each other has been described. However, the positional relationship between the identification medium and the observational linear polarizer during the observation is not limited to this state. For example, such a latent image can be observed even by observation in a state where the identification medium and the observational linear polarizer come close to each other by, for example, placing the observational linear polarizer on the identification medium.

In the aforementioned examples, a case where the linear polarizer (the observational linear polarizer 191(X) and the observational linear polarizer 191(Y)) is used as the observational polarizer has been described. However, the present invention is not limited to this case, and other polarizers than the linear polarizer may also be used as the observational polarizer.

As an example, a clockwise circular polarizer, a counterclockwise circular polarizer, or a combination thereof may be used as the observational polarizer instead of the linear polarizer. In a case where the light A114(Y) and the light A124(R) are observed through a clockwise circular polarizer that selectively transmits clockwise circularly polarized light, the brightness values (relative theoretical values in a case where brightness of incident light is set to 100) thereof are 25 and 50, respectively, and the isotropic layer 102(N) is observed as a relatively bright area.

On the other hand, in a case where the light A114(Y) and the light A124(R) are observed through a counterclockwise circular polarizer that selectively transmits counterclockwise circularly polarized light, the brightness values thereof are 25 and 0, respectively, and the layer 102(Xy) functioning as a λ/4 wave plate is observed as a relatively bright area.

Therefore, the identification function can be expressed by a relative brightness change by comparison among two or more observation methods among the observation not via a circular polarizer, the observation via a clockwise circular polarizer, and the observation via a counterclockwise circular polarizer.

(Method for Using Identification Medium of Embodiment 1: No. 2)

The aforementioned example is an example of the use method using unpolarized light as light to be incident on the identification medium 100. In the following, another example of the use method using linearly polarized light as light to be incident on the identification medium 100 will now be described.

In a case where light to be incident is polarized light (linearly polarized light, circularly polarized light, or elliptically polarized light), in observation of reflected light, reflected light as it is may directly be visually observed not via the observational linear polarizer.

In a case where light to be incident is linearly polarized light, as such linearly polarized light, linearly polarized light obtained by allowing unpolarized light to pass through a linear polarizer may be used. The device that supplies linearly polarized light may be a dedicated article to the use method of the present invention, but a general light source and a general linear polarizer for use in other applications may be used in combination. Alternatively, a general device in which a light source and a linear polarizer for use in other applications are combined may be used.

In a case where polarized light to be incident is circularly polarized light, as such circularly polarized light, circularly polarized light obtained by allowing unpolarized light to pass through a circular polarizer may be used. The device that supplies circularly polarized light may be a dedicated article to the use method of the present invention, but a general light source and a general circular polarizer for use in other applications may be used in combination. Alternatively, a general device in which a light source and a circular polarizer for use in other applications are combined may be used.

In a case where polarized light to be incident is elliptically polarized light, as such elliptically polarized light, elliptically polarized light obtained by allowing unpolarized light to pass through an appropriate optical element may be used. The device that supplies elliptically polarized light may be a dedicated article to the use method of the present invention, but a general light source and a general linear polarizer or circular polarizer for use in other applications may be used in combination. Alternatively, a general device in which a light source and a linear polarizer or circular polarizer for use in other applications are combined may be used.

For example, since many of general electronic devices including a display screen, such as a personal computer and a smartphone including a liquid crystal display screen, emit linearly polarized light as emitted light from the display screen, such an electronic device may be used as a device that supplies linearly polarized light. More specifically, by an operation of, e.g., bringing such an electronic device close to the identification medium, the identification medium can be placed under an environment in which less unpolarized environmental light is incident while relatively more emitted light from the electronic device is incident, and supply of linearly polarized light can thus be achieved.

As another example, since some of general electronic devices including a display screen, such as a personal computer and a smartphone including a liquid crystal display screen, emit circularly polarized light as emitted light from the display screen, such an electronic device may be used as a device that supplies circularly polarized light. More specifically, by an operation of, e.g., bringing such an electronic device close to the identification medium, the identification medium can be placed under an environment in which less unpolarized environmental light is incident while relatively more emitted light from the electronic device is incident, and supply of circularly polarized light can thus be achieved.

As still another example, there are cases where a film as a post-production attachment is attached for various purposes to the display surface of the aforementioned electronic device that emits linearly polarized light or circularly polarized light. Examples of such a post-production attachment film may include films to be attached for various purposes such as protection of the display screen, adjustment of the viewing angle of the display screen, and improvement of the degree of visual recognition in a case of observation of the display screen via polarized sunglasses. Many of these films have a certain phase difference and can express a function of converting linearly polarized light into circularly polarized light or elliptically polarized light or converting circularly polarized light into linearly polarized light or elliptically polarized light. By using an electronic device with a post-production attachment film having such a feature, supply of linearly polarized light, circularly polarized light, or other light such as elliptically polarized light can be achieved.

Figure 5:
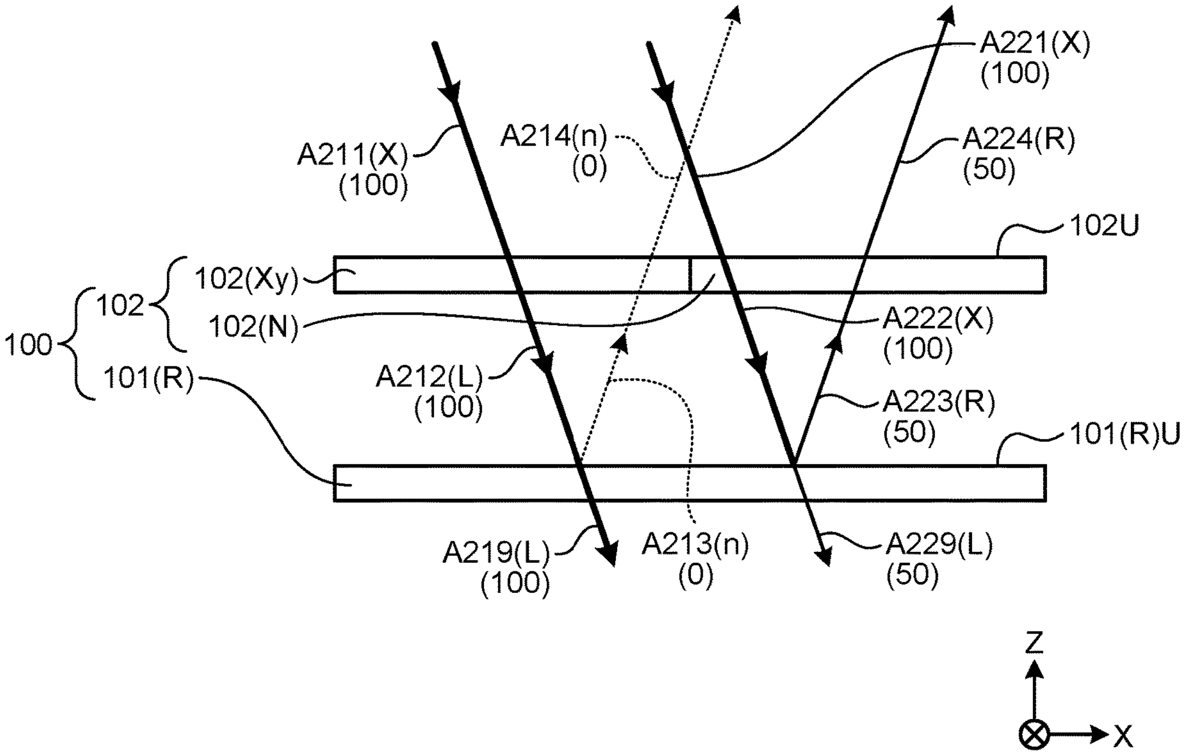
FIG. 5 is an exploded side view schematically illustrating another example of the method for using the identification medium 100 illustrated in FIGS. 1, 2, and 4.
Figure 6:
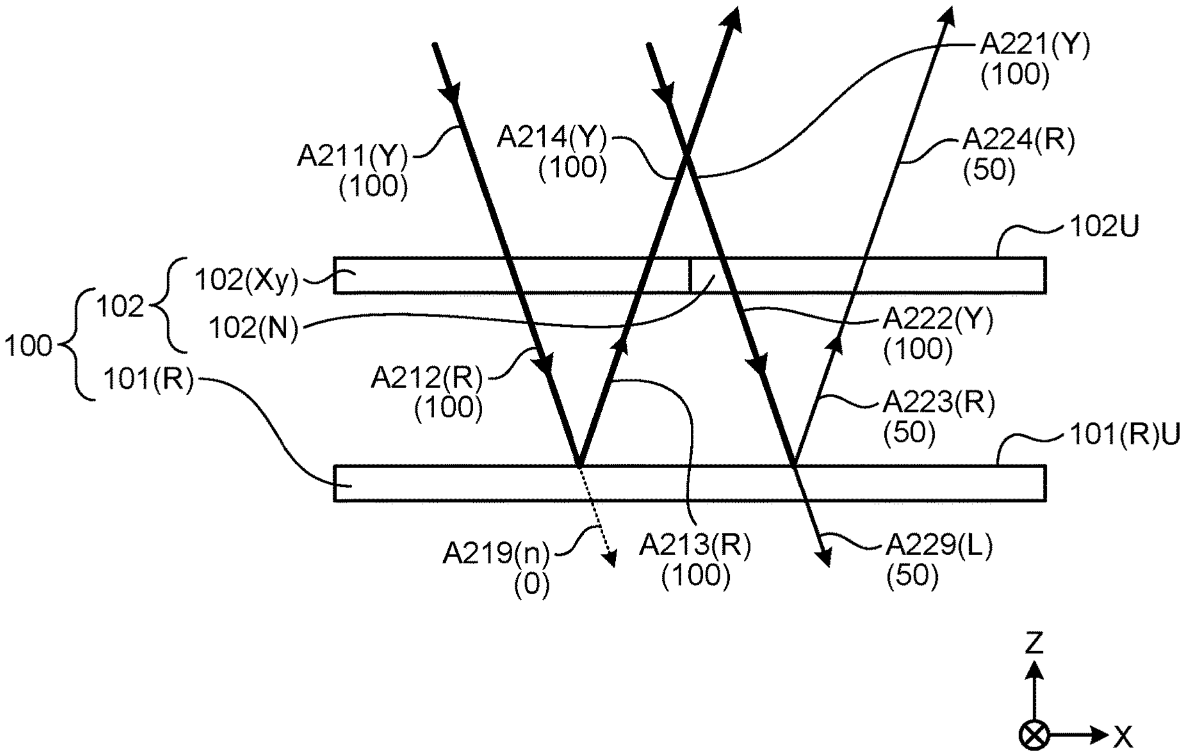
FIG. 6 is an exploded side view schematically illustrating an example of the method for using an identification medium of the present invention in a case where the relative angular relationship between the identification medium and the vibration direction of the incident linearly polarized light is changed from that in the example in FIG. 5.

Each of FIGS. 5 and 6 is an exploded side view schematically illustrating another example of the method for using the identification medium 100 illustrated in FIGS. 1 and 2, and 4.

In the example illustrated in FIG. 5, incident light on the identification medium 100 is linearly polarized light whose vibration direction is in the direction of the X-axis. That is, incident light A211(X) and A221(X), which are linearly polarized light whose vibration direction is in the direction of the X-axis, are incident on the layer 102(Xy) functioning as a λ/4 wave plate and the isotropic layer 102(N) of the patterned phase difference layer 102, respectively.

The incident light A211(X) is transmitted through the layer 102(Xy), is emitted downward as light A212(L) that is counterclockwise circularly polarized light, and reaches the upper surface 101(R)U of the light reflection layer 101(R). Since the light reflection layer 101(R) is a clockwise reflection-type circular polarizer, the entirety of the light A212(L) is transmitted through the light reflection layer 101(R) and becomes transmitted light A219(L). Hence, the theoretical value for the brightness of reflected light A213(*n*) by the light reflection layer 101(R) is zero, and the theoretical value for the brightness of light A214(*n*) transmitted through the layer 102 (Xy) again and emitted from the display surface of the identification medium 100 is also zero.

On the other hand, the incident light A221(X) is transmitted through the layer 102(N), is emitted downward as light A222(X) that is linearly polarized light, and reaches the upper surface 101(R)U of the light reflection layer 101(R). The clockwise circular polarization component of the light A222(X) is reflected and becomes reflected light A223(R), and the theoretical value for the brightness thereof is half the incident light. On the other hand, the counterclockwise circular polarization component of the light A222(X) is transmitted through the light reflection layer 101(R) and becomes transmitted light A229(L).

The light A223(R) is transmitted through the layer 102(N) again and is emitted as light A224(R) from the display surface of the identification medium 100. The theoretical value for the brightness of the light A224(R) is equal to that for the brightness of the light A223(R).

As a result, in a case where the identification medium 100 in a state of receiving linearly polarized light whose vibration direction is in the direction of the X-axis is observed, the area occupied by the layer 102(Xy) is observed as a relatively dark area with no reflected light while the area occupied by the layer 102(N) is observed as a relatively bright area with reflected light which is ½ of the incident light in terms of brightness.

FIG. 6 is an exploded side view schematically illustrating an example of the method for using an identification medium of the present invention in a case where the relative angular relationship between the identification medium and the vibration direction of the incident linearly polarized light is changed from that in the example in FIG. 5. FIG. 6 illustrates a case where the angles of the identification medium 100 with respect to the coordinate axes are fixed, and where the angles of the vibration direction of the linearly polarized light with respect to the X-axis and the Y-axis are changed. However, in actual use, such a change in the relative angular relationship may be done by movement of the identification medium, movement of the light source, replacement of the light source, or a combination of these two or more ways.

The example in FIG. 6 is a changed example in which incident light on the identification medium 100 is linearly polarized light whose vibration direction is in the direction of the Y-axis as a result of the change in the relative angular relationship. That is, incident light A211(Y) and A221(Y), which are linearly polarized light whose vibration direction is in the direction of the Y-axis, are incident on the layer 102(Xy) and the layer 102(N), respectively.

The incident light A211(Y) is transmitted through the layer 102(Xy), is emitted downward as light A212(R) that is clockwise circularly polarized light, and reaches the upper surface 101(R)U of the light reflection layer 101(R). Since the light reflection layer 101(R) is a clockwise reflection-type circular polarizer, the entirety of the light A212(R) is reflected by the light reflection layer 101(R) and becomes reflected light A213(R). The theoretical value for the brightness of the light A213(R) is equal to that for the brightness of the light A212(R). On the other hand, the theoretical value for the brightness of light A219(*n*) transmitted through the light reflection layer 101(R) is zero.

The light A213(R) is transmitted through the layer 102 (Xy) again and is emitted as light A214(Y) from the display surface of the identification medium 100. The theoretical value for the brightness of the light A214(Y) is equal to that for the brightness of the light A213(R).

On the other hand, the incident light A221(Y) is transmitted through the layer 102(N), is emitted downward as light A222(Y) that is linearly polarized light, and reaches the upper surface 101(R)U of the light reflection layer 101(R). The clockwise circular polarization component of the light A222(Y) is reflected and becomes the reflected light A223 (R), and the theoretical value for the brightness thereof is half the incident light. On the other hand, the counterclockwise circular polarization component of the light A222(Y) is transmitted through the light reflection layer 101(R) and becomes the transmitted light A229(L).

The light A223(R) is transmitted through the layer 102(N) again and is emitted as the light A224(R) from the display surface of the identification medium 100. The theoretical value for the brightness of the light A224(R) is equal to that for the brightness of the light A223(R).

As a result, in a case where the identification medium 100 in a state of receiving linearly polarized light whose vibration direction is in the direction of the Y-axis is observed, the area occupied by the layer 102(Xy) is observed as a relatively bright area with reflected light which is equivalent to the incident light in terms of brightness. The area occupied by the layer 102(N) is observed as an area with reflected light which is ½ of the incident light in terms of brightness. The brightness of the layer 102(N) has no change from that in the case illustrated in FIG. 5, but in this example, the layer 102(N) is observed as a relatively darker area than the area occupied by the layer 102 (Xy).

Accordingly, by changing the relative angular relationship between the identification medium and the vibration direction of the linearly polarized light from that in the example in FIG. 5 to that in the example in FIG. 6, the relative brightness among the plurality of areas changes in a case of observation with use of the linearly polarized light as the incident light. More specifically, when the orientation of the vibration direction of the linearly polarized light is changed from the state of the direction of the X-axis in FIG. 5 by rotating the orientation about a certain axis parallel to the direction of the Z-axis, the relative brightness of the area occupied by the layer 102 (Xy) becomes higher along with the increase of the rotation angle, and the relative brightness becomes maximum when the orientation of the vibration direction of the linearly polarized light reaches the state of the direction of the Y-axis in FIG. 6.

In a case where such a change in brightness is achieved in the entire visible area or in as nearly broad a wavelength range as the entire visible area, the change in brightness can be observed as a change from a dark black state to a bright silver state. In a case where the change in brightness is achieved only in a partial wavelength range of the visible area, the change in brightness can be observed as a color change corresponding to the wavelength range in which the change occurs.

On the other hand, in a case where the identification medium 100 in a state of receiving unpolarized light is observed not via the observational linear polarizer, the observer observes the emitted light A114(Y) and A124(R) illustrated in the examples in FIGS. 1 and 2, and 4. The observer cannot recognize the difference. In addition, even when the relative angular relationship between the identification medium 100 and the observer changes, the observer cannot recognize the change based on the difference between the polarization states.

In the use method in this example, the identification medium of the present invention can provide a special effect wherein a relative brightness change is observed only in a case where linearly polarized light is used as a light source. Such a special effect cannot be obtained from a copied article easily obtained by a general technique such as printing. Therefore, the identification medium of the present invention exerts excellent anti-counterfeit performance in such use.

In addition, such a special effect is obtained in a case of observation with use of linearly polarized light as incident light. Such observation can be achieved by an easy operation of visually observing the identification medium in a state of bringing an electronic device, such as a smartphone, which emits linearly polarized light, close to the display medium. Therefore, the identification medium of the present invention exerts a high identification function in such use.

In the aforementioned examples, a case where the incident light is linearly polarized light (the incident light A211(X) and the incident light A221(X), and the incident light A211(Y) and the incident light A221(Y)) has been described. However, the present invention is not limited to this case, and other polarized light than the linearly polarized light may also be used as incident light.

As an example, clockwise circularly polarized light, counterclockwise circularly polarized light, or a combination thereof may be used as incident light instead of the linearly polarized light. In a case where clockwise circularly polarized light is used instead of the incident light A211(X) and the incident light A221(X), the brightness values (relative theoretical values in a case where brightness of incident light is set to 100) of emitted light from the layer 102(Xy) and emitted light from the layer 102(N) are 50 and 100, respectively, and the isotropic layer 102(N) is observed as a relatively bright area.

On the other hand, in a case where counterclockwise circularly polarized light is used instead of the incident light A211(X) and the incident light A221(X), the brightness values of emitted light from the layer 102(Xy) and emitted light from the layer 102(N) are 50 and 0, respectively, and the layer 102 (Xy) functioning as a λ/4 wave plate is observed as a relatively bright area.

Therefore, the identification function can be expressed by a relative brightness change by comparison among two or more observation methods among the observation in which unpolarized light is made incident, the observation in which clockwise circularly polarized light is made incident, and the observation in which counterclockwise circularly polarized light is made incident. Some of electronic devices, such as a smartphone provided with a certain kind of protective film, emit circularly polarized light. Thus, such observation can be achieved by an operation of visually observing the identification medium in a state of bringing the electronic device, which emits circularly polarized light, close to the display medium.

Identification Medium: Embodiment 2

In FIGS. 1 to 2 and 4 to 6, the identification medium 100 is illustrated that includes as a light reflection layer a reflection-type circular polarizer and as a patterned phase difference layer a layer a part of which functions as a λ/4 wave plate. However, the identification medium of the present invention is not limited to this identification medium and may have another configuration. For example, the identification medium of the present invention may include as a light reflection layer a reflection-type linear polarizer and as a patterned phase difference layer a layer a part of which functions as a λ/2 wave plate. Such an example will be described hereinafter with reference to FIGS. 7 to 10.

Figure 7:
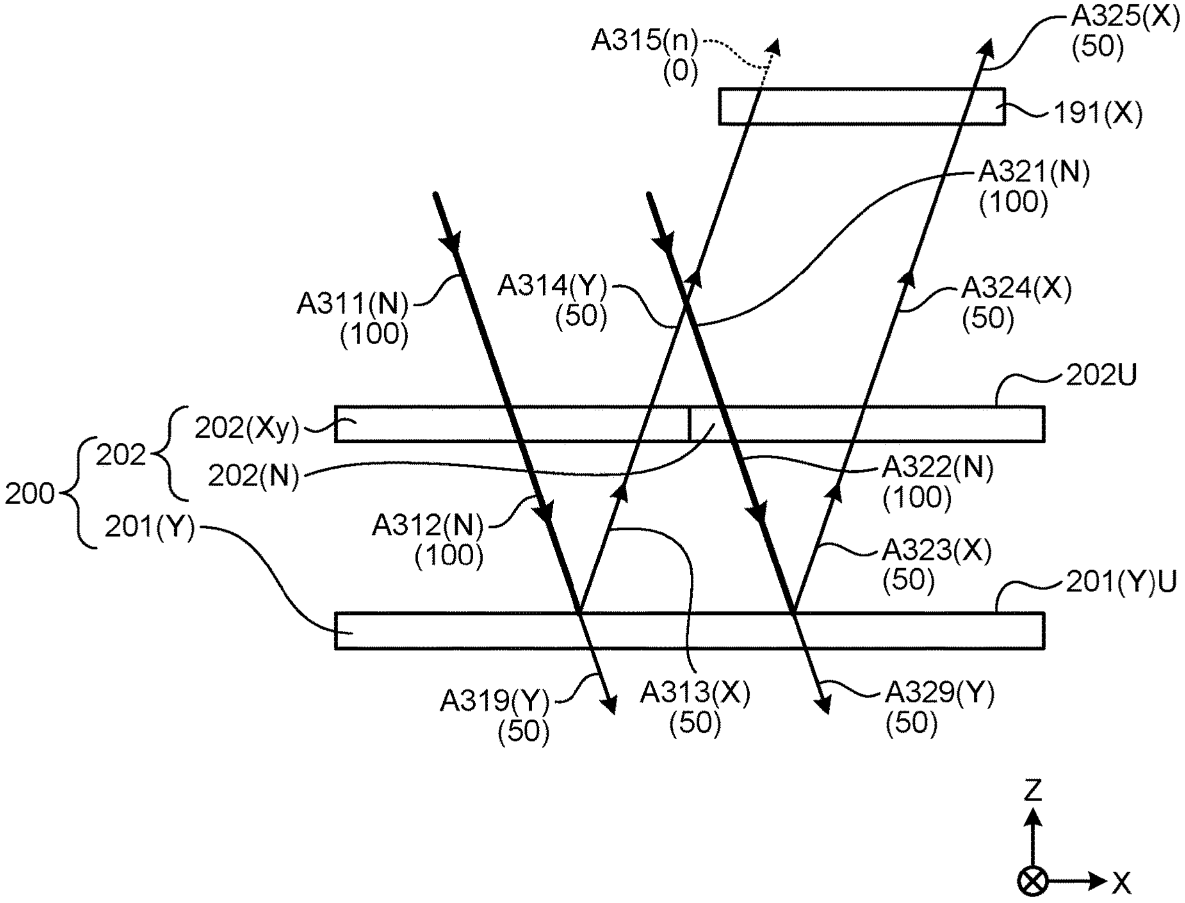
FIG. 7 is an exploded side view schematically illustrating another example of the identification medium of the present invention and the method for using the same.

FIG. 7 is an exploded side view schematically illustrating another example of the identification medium of the present invention and the method for using the same. In FIG. 7, an identification medium 200 includes a light reflection layer 201(Y) and a patterned phase difference layer 202. In this example, the entire area of an upper surface 201(Y)U of the light reflection layer 201(Y) is an area corresponding to a display surface and the patterned phase difference layer 202 is provided occupying the entire area of the upper surface. As for the patterned phase difference layer 202, only a part thereof is a layer 202(Xy) functioning as a λ/2 wave plate, and the other part is an isotropic layer 202(N).

In the identification medium 200, an upper-side surface 202U of the patterned phase difference layer 202 functions as the display surface. That is, a part of light incident on the surface 202U of the identification medium 200 is reflected inside the identification medium 200 and is emitted from the surface 202U, and an observer observes the light, to express a function as the identification medium.

In the example in FIG. 7, a reflection-type linear polarizer whose transmission axis is positioned in the direction of the Y-axis is used as the light reflection layer 201(Y). That is, the light reflection layer 201(Y) transmits, of light incident on the upper surface 201(Y)U, a linear polarization component whose vibration direction is in the direction of the Y-axis and reflects a linear polarization component whose vibration direction is in the direction of the X-axis.

In the example in FIG. 7, the patterned phase difference layer 202 is a combination of the layer 202(Xy) functioning as a λ/2 wave plate and the isotropic layer 202(N) disposed in the horizontal direction. Therefore, an area occupied by the layer 202(Xy) occupies a partial area of the display surface of the identification medium 200. The layer 202(Xy) has a slow axis in the Xy direction.

Method for Using Identification Medium of Embodiment 2: No. 1

FIG. 7 illustrates an example in which incident light on the identification medium 200 is unpolarized light, and in which reflected light from the identification medium 200 is observed via the observational linear polarizer 191(X). In this example, the observational linear polarizer 191(X) is the same as that illustrated in FIGS. 1 and 2 and is a polarizer positioned at a relative angle to the identification medium 200 so that the observational linear polarizer 191(X) has a transmission axis in the direction of the X-axis. Therefore, in this example, the slow axis of the layer 202(Xy) is inclined by 45° counterclockwise with respect to the transmission axis of the observational linear polarizer 191(X). The transmission axis of the light reflection layer 201(Y) is orthogonal to the transmission axis of the observational linear polarizer 191(X).

In the example of using the identification medium 200 illustrated in FIG. 7, incident light A311(N) and A321(N), which are unpolarized light, are incident on the layer 202 (Xy) functioning as a λ/2 wave plate and the isotropic layer 202(N) of the patterned phase difference layer 202, respectively.

The incident light A311(N) is transmitted through the layer 202(Xy), is emitted downward as light A312(N) that is unpolarized light, and reaches the upper surface 201(Y)U of the light reflection layer 201(Y). Since the light reflection layer 201(Y) is a reflection-type linear polarizer whose transmission axis is positioned in the direction of the Y-axis, the linear polarization component, whose vibration direction is in the direction of the X-axis, of the light A312(N) is reflected and becomes reflected light A313(X), and the theoretical value for the brightness thereof is half the incident light. On the other hand, the linear polarization component, whose vibration direction is in the direction of the Y-axis, of the light A312(N) is transmitted through the light reflection layer 201(Y) and becomes transmitted light A319 (Y).

The light A313(X) is transmitted through the layer 202 (Xy) again and is emitted as light A314(Y) from the display surface of the identification medium 200. Since the light A313(X) is linearly polarized light whose vibration direction is in the direction of the X-axis, and the layer 202(Xy) is a λ/2 wave plate having a slow axis in the XY direction, the light A314(Y) becomes linearly polarized light whose polarization direction is in the direction of the Y-axis, and the theoretical value for the brightness thereof is equal to that for the brightness of the light A313(X).

When the emitted light A314(Y) is incident on the observational linear polarizer 191(X), the entirety of the light A314(Y) is shielded, and the theoretical value for the brightness of emitted light A315(*n*) from the observational linear polarizer 191(X) is zero since the polarization vibration direction of the light A314(Y) and the transmission axis of the observational linear polarizer 191(X) are orthogonal to each other.

On the other hand, the incident light A321(N) is transmitted through the layer 202(N), is emitted downward as light A322(N) that is unpolarized light, and reaches the upper surface 201(Y)U of the light reflection layer 201(Y). The linear polarization component, whose vibration direction is in the direction of the X-axis, of the light A322(N) is reflected and becomes reflected light A323(X), and the theoretical value for the brightness thereof is half the incident light. On the other hand, the linear polarization component, whose vibration direction is in the direction of the Y-axis, of the light A322(N) is transmitted through the light reflection layer 201(Y) and becomes transmitted light A329 (Y).

The light A323(X) is transmitted through the layer 202(N) again and is emitted as light A324(X) from the display surface of the identification medium 100. The theoretical value for the brightness of the light A324(X) is equal to that for the brightness of the light A323(X).

When the emitted light A324(X) is incident on the observational linear polarizer 191(X), the entirety of the light A324 is emitted as emitted light A325(X) from the observational linear polarizer 191(X) since the polarization vibration direction of the light A324(X) and the transmission axis of the observational linear polarizer 191(X) are parallel to each other. The theoretical value for the brightness of the emitted light A325(X) is equal to that for the brightness of the light A324(X).

As a result, in a case where the identification medium 200 in a state of receiving unpolarized light is observed via the observational linear polarizer 191(X), the area occupied by the layer 202(Xy) is observed as a relatively dark area with no reflected light while the area occupied by the layer 202(N) is observed as a relatively bright area with reflected light which is ½ of the incident light in terms of brightness.

Figure 8:
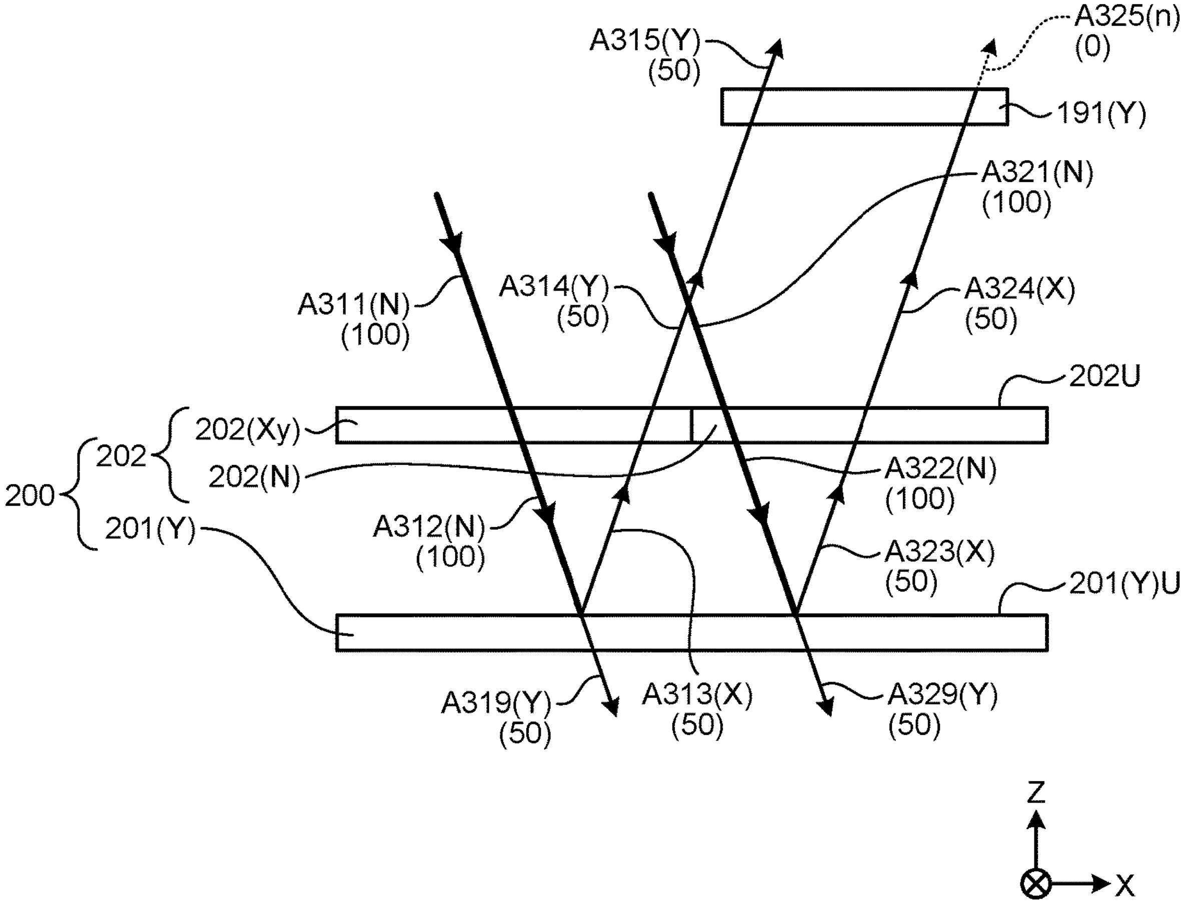
FIG. 8 is an exploded side view schematically illustrating an example of the method for using an identification medium of the present invention in a case where the relative angular relationship between the identification medium and the observational linear polarizer is changed from that in the example in FIG. 7.

FIG. 8 is an exploded side view schematically illustrating an example of the method for using an identification medium of the present invention in a case where the relative angular relationship between the identification medium and the observational linear polarizer is changed from that in the example in FIG. 7. FIG. 8 illustrates a case where the angles of the identification medium 200 with respect to the coordinate axes are fixed, and where the angles of the observational linear polarizer with respect to the X-axis and the Y-axis are changed. However, in actual use, such a change in the relative angular relationship may be done by movement of the identification medium, movement of the observational linear polarizer, replacement of the observational linear polarizer, or a combination of these two or more ways.

The example in FIG. 8 is a changed example of using the observational linear polarizer 191(Y) as an observational linear polarizer as a result of the change in the relative angular relationship. The observational linear polarizer 191 (Y) is a polarizer positioned at a relative angle to the identification medium 200 so that the observational linear polarizer 191(Y) has a transmission axis in the direction of the Y-axis. Therefore, in this example, the slow axis of the layer 202(Xy) is inclined by 45° clockwise with respect to the transmission axis of the observational linear polarizer 191(Y).

In the example of using the identification medium 200 illustrated in FIG. 8, the incident light A311(N) and A321 (N), which are unpolarized light, are incident on the layer 202(Xy) functioning as a λ/2 wave plate and the isotropic layer 202(N) of the patterned phase difference layer 202, respectively, and respective parts of these are emitted as the light A314(Y) and A324(X) from the display surface of the identification medium 200. The light paths so far are the same as those in the example in FIG. 7.

When the emitted light A314(Y) is incident on the observational linear polarizer 191(Y), the entirety of the light A314(Y) is transmitted and is emitted as emitted light A315(Y) from the observational linear polarizer 191(Y) since the polarization vibration direction of the light A314 (Y) and the transmission axis of the observational linear polarizer 191(Y) are parallel to each other. The theoretical value for the brightness of the emitted light A315(Y) is equal to the value for the brightness of the light A314(Y).

On the other hand, when the emitted light A324(X) is incident on the observational linear polarizer 191(Y), the entirety of the light A324(X) is shielded, and the theoretical value for the brightness of emitted light A325(*n*) from the observational linear polarizer 191(Y) is zero since the polarization vibration direction of the light A324(X) and the transmission axis of the observational linear polarizer 191 (Y) are orthogonal to each other.

As a result, in a case where the identification medium 200 in a state of receiving unpolarized light is observed via the observational linear polarizer 191(Y), the area occupied by the layer 202(Xy) is observed as a relatively bright area with reflected light which is ½ of the incident light in terms of brightness. On the other hand, the area occupied by the layer 102(N) is observed as a relatively dark area with no reflected light.

Accordingly, by changing the relative angular relationship between the identification medium and the observational linear polarizer from that in the example in FIG. 7 to that in the example in FIG. 8, the relative brightness among the plurality of areas changes in a case of observation via the observational linear polarizer. More specifically, when the orientation of the observational linear polarizer is changed from the state of the observational linear polarizer 191(X) in FIG. 7 by rotating the polarizer about a certain axis parallel to the direction of the Z-axis, the relative brightness of the area occupied by the layer 202(Xy) becomes higher along with the increase of the rotation angle, and the relative brightness becomes maximum when the orientation of the observational linear polarizer reaches the state of the observational linear polarizer 191(Y) in FIG. 8.

In a case where such a change in brightness is achieved in the entire visible area or in as nearly broad a wavelength range as the entire visible area, the change in brightness can be observed as a change from a dark black state to a bright silver state. In a case where the change in brightness is achieved only in a partial wavelength range of the visible area, the change in brightness can be observed as a color change corresponding to the wavelength range in which the change occurs.

On the other hand, in a case where the identification medium 200 in a state of receiving unpolarized light is observed not via the observational linear polarizer, the observer observes the emitted light A314(Y) and A324(X). The emitted light A314(Y) and A324(X) have different polarization states but the same brightness. Since the difference between the polarization states cannot be recognized in human vision, the observer cannot recognize the difference. In addition, even when the relative angular relationship between the identification medium 200 and the observer changes, the observer cannot recognize the change based on the difference between the polarization states.

In the use method in this example, the identification medium of the present invention can provide a special effect wherein a relative brightness change is observed only in a case where the identification medium is observed via the observational linear polarizer. In addition, such a special effect can be obtained in a case where incident light is unpolarized light, and where the linear polarization component of the reflected light is selectively observed, and such observation can be done easily as described above. Therefore, the identification medium of the present invention exerts excellent anti-counterfeit performance and a high identification function in such use.

(Method for Using Identification Medium of Embodiment 2: No. 2)

The aforementioned example is an example of the use method using unpolarized light as light to be incident on the identification medium 200. In the following, another example of the use method using linearly polarized light as light to be incident on the identification medium 200 will now be described.

In a case where light to be incident is linearly polarized light, in observation of reflected light, reflected light as it is may directly be visually observed not via the observational linear polarizer. The manner of supplying linearly polarized light may be the same as one in Embodiment 1 described with reference to FIGS. 5 and 6.

Figure 9:
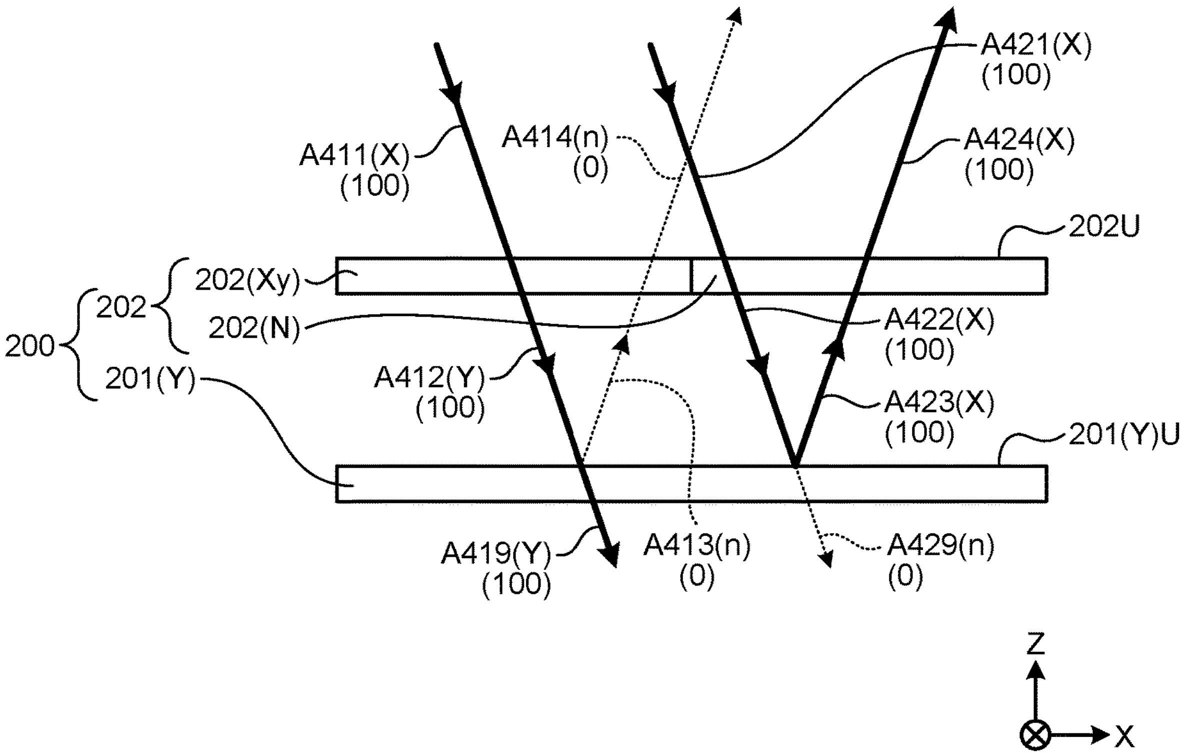
FIG. 9 is an exploded side view schematically illustrating another example of the method for using the identification medium 200 illustrated in FIGS. 7 and 8.
Figure 10:
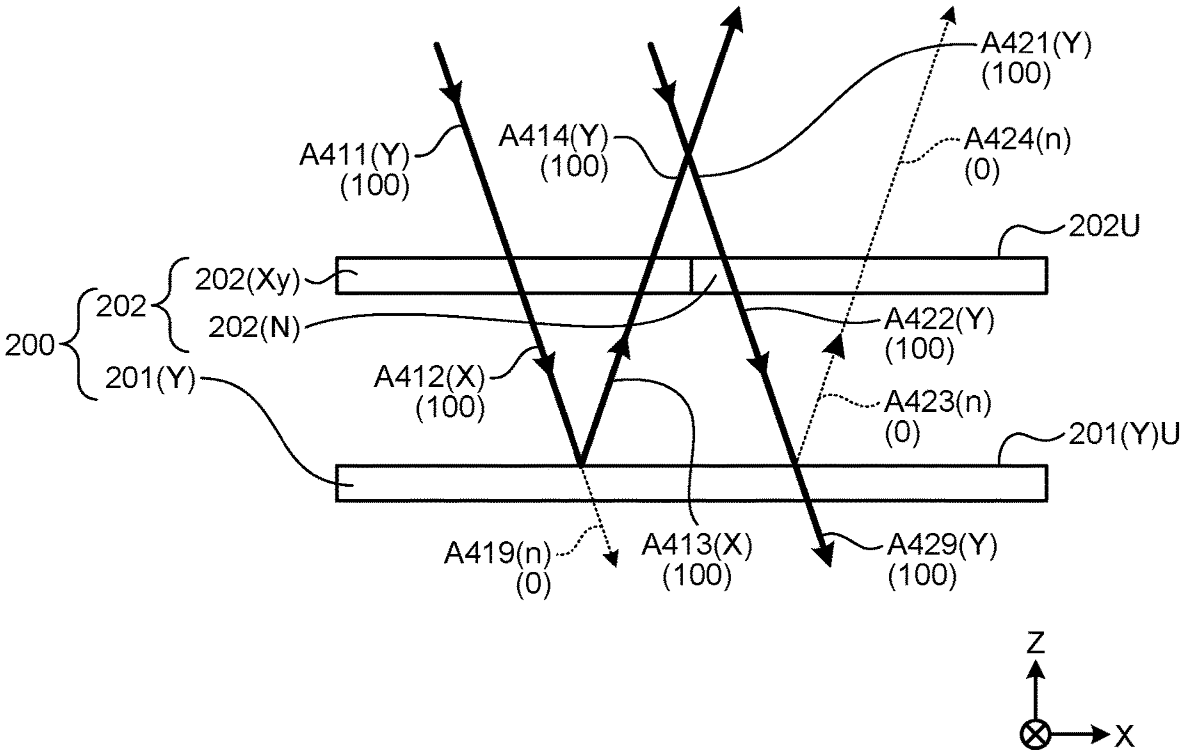
FIG. 10 is an exploded side view schematically illustrating an example of the method for using an identification medium of the present invention in a case where the relative angular relationship between the identification medium and the vibration direction of the incident linearly polarized light is changed from that in the example in FIG. 9.

Each of FIGS. 9 and 10 is an exploded side view schematically illustrating another example of the method for using the identification medium 200 illustrated in FIGS. 7 and 8.

In the example illustrated in FIG. 9, incident light on the identification medium 200 is linearly polarized light whose vibration direction is in the direction of the X-axis. That is, incident light A411(X) and A421(X), which are linearly polarized light whose vibration direction is in the direction of the X-axis, are incident on the layer 202(Xy) functioning as a λ/2 wave plate and the isotropic layer 202(N) of the patterned phase difference layer 202, respectively.

The incident light A411(X) is transmitted through the layer 202(Xy), is emitted downward as light A412(Y) that is linearly polarized light whose vibration direction is in the direction of the Y-axis, and reaches the upper surface 201(Y)U of the light reflection layer 201(Y). Since the light reflection layer 201(Y) is a reflection-type linear polarizer whose transmission axis is positioned in the direction of the Y-axis, the entirety of the light A412(Y) is transmitted through the light reflection layer 201(Y) and becomes transmitted light A419(Y). Hence, the theoretical value for the brightness of reflected light A413(*n*) by the light reflection layer 201(Y) is zero, and the theoretical value for the brightness of light A414(*n*) transmitted through the layer 202(Xy) again and emitted from the display surface of the identification medium 200 is also zero.

On the other hand, the incident light A421(X) is transmitted through the layer 202(N), is emitted downward as light A422(X) that is linearly polarized light, and reaches the upper surface 201(Y)U of the light reflection layer 201(Y). Since the light reflection layer 201(Y) is a reflection-type linear polarizer whose transmission axis is positioned in the direction of the Y-axis, the entirety of the light A422(X) is reflected by the light reflection layer 201(Y) and becomes reflected light A423(X). The theoretical value for the brightness of the light A423(X) is equal to that for the brightness of the light A422(X). On the other hand, the theoretical value for the brightness of transmission light A429(*n*) transmitted through the light reflection layer 201(Y) is zero.

The light A423(X) is transmitted through the layer 202(N) again and is emitted as light A424(X) from the display surface of the identification medium 200. The theoretical value for the brightness of the light A424(X) is equal to that for the brightness of the light A423(X).

As a result, in a case where the identification medium 200 in a state of receiving linearly polarized light whose vibration direction is in the direction of the Y-axis is observed, the area occupied by the layer 202(Xy) is observed as a relatively dark area with no reflected light. The area occupied by the layer 202(N) is observed as a relatively bright area with reflected light which is equivalent to the incident light in terms of brightness.

FIG. 10 is an exploded side view schematically illustrating an example of the method for using an identification medium of the present invention in a case where the relative angular relationship between the identification medium and the vibration direction of the incident linearly polarized light is changed from that in the example in FIG. 9. FIG. 10 illustrates a case where the angles of the identification medium 200 with respect to the coordinate axes are fixed, and where the angles of the vibration direction of the linearly polarized light with respect to the X-axis and the Y-axis are changed. However, in actual use, such a change in the relative angular relationship may be done by movement of the identification medium, movement of the light source, replacement of the light source, or a combination of these two or more ways.

The example in FIG. 10 is a changed example in which incident light on the identification medium 200 is linearly polarized light whose vibration direction is in the direction of the Y-axis as a result of the change in the relative angular relationship. That is, incident light A411(Y) and A421(Y), which are linearly polarized light whose vibration direction is in the direction of the Y-axis, are incident on the layer 202(Xy) and the layer 202(N), respectively.

The incident light A411(Y) is transmitted through the layer 202(Xy), is emitted downward as light A412(X) that is linearly polarized light whose vibration direction is in the direction of the X-axis, and reaches the upper surface 201(Y)U of the light reflection layer 201(Y). Since the light reflection layer 201(Y) is a reflection-type linear polarizer whose transmission axis is positioned in the direction of the Y-axis, the entirety of the light A412(X) is reflected by the light reflection layer 201(Y) and becomes reflected light A413(X). The theoretical value for the brightness of the light A413(X) is equal to that for the brightness of the light A412(X). On the other hand, the theoretical value for the brightness of transmission light A419(*n*) transmitted through the light reflection layer 201(Y) is zero.

The light A413(X) is transmitted through the layer 202(Xy) again and is emitted as light A414(Y) from the display surface of the identification medium 200. The theoretical value for the brightness of the light A414(Y) is equal to that for the brightness of the light A413(X).

On the other hand, the incident light A421(Y) is transmitted through the layer 202(N), is emitted downward as light A422(Y) that is linearly polarized light, and reaches the upper surface 201(Y)U of the light reflection layer 201(Y).

Since the light reflection layer 201(Y) is a reflection-type linear polarizer whose transmission axis is positioned in the direction of the Y-axis, the entirety of the light A422(Y) is transmitted through the light reflection layer 201(Y) and becomes transmission light A429(Y). Hence, the theoretical value for the brightness of reflected light A423(*n*) by the light reflection layer 201(Y) is zero, and the theoretical value for the brightness of light A424(*n*) transmitted through the layer 202(Xy) again and emitted from the display surface of the identification medium 200 is also zero.

As a result, in a case where the identification medium 200 in a state of receiving linearly polarized light whose vibration direction is in the direction of the Y-axis is observed, the area occupied by the layer 202(Xy) is observed as a relatively bright area with reflected light which is equivalent to the incident light in terms of brightness. The area occupied by the layer 202(N) is observed as a relatively dark area with no reflected light.

Accordingly, by changing the relative angular relationship between the identification medium and the vibration direction of the linearly polarized light from that in the example in FIG. 9 to that in the example in FIG. 10, the relative brightness among the plurality of areas changes in a case of observation with use of the linearly polarized light as the incident light. More specifically, when the orientation of the vibration direction of the linearly polarized light is changed from the state of the direction of the X-axis in FIG. 9 by rotating the orientation about a certain axis parallel to the direction of the Z-axis, the relative brightness of the area occupied by the layer 202(Xy) becomes higher along with the increase of the rotation angle, and the relative brightness becomes maximum when the orientation of the vibration direction of the linearly polarized light reaches the state of the direction of the Y-axis in FIG. 10.

In a case where such a change in brightness is achieved in the entire visible area or in as nearly broad a wavelength range as the entire visible area, the change in brightness can be observed as a change from a dark black state to a bright silver state. In a case where the change in brightness is achieved only in a partial wavelength range of the visible area, the change in brightness can be observed as a color change corresponding to the wavelength range in which the change occurs.

On the other hand, in a case where the identification medium 200 in a state of receiving unpolarized light is observed not via the observational linear polarizer, the observer observes the emitted light A314(Y) and A324(X) illustrated in the examples in FIGS. 7 and 8. The observer cannot recognize the difference. In addition, even when the relative angular relationship between the identification medium 200 and the observer changes, the observer cannot recognize the change based on the difference between the polarization states.

In the use method in this example, the identification medium of the present invention can provide a special effect wherein a relative brightness change is observed only in a case where linearly polarized light is used as a light source. Such a special effect cannot be obtained from a copied article easily obtained by a general technique such as printing. In addition, such a special effect can be obtained in a case where incident light is linearly polarized light, and such observation can be done easily as described above. Therefore, the identification medium of the present invention exerts excellent anti-counterfeit performance and a high identification function in such use.

(Specific Example of Light Reflection Layer)

The light reflection layer is a layer that reflects incident light as circularly or linearly polarized light. Examples of the light reflection layer may include a reflection-type circular polarizer exemplified as the light reflection layer 101(R) described above, and a reflection-type circular polarizer exemplified as the light reflection layer 201(Y) described above. The light reflection layer may be those that express such a function by only one layer, or those that express such a function by a combination of a plurality of layers.

Examples of reflection-type circular polarizers may include layers of materials having cholesteric regularity. Cholesteric regularity is a structure in which the angles of molecular axes in stacking planes are shifted (twisted) as the planes are observed sequentially passing through the stacked planes, such that molecular axes in a certain plane in the material are oriented in a constant direction, molecular axes in a subsequent plain stacking thereon are oriented in a direction shifted by a small angle with respect to that of the certain plane, and molecular axes in still another plane are oriented in a direction of a further shifted angle. That is, in a case where molecules inside a layer of a certain material have the cholesteric regularity, the molecules in a certain first plane inside the layer are arrayed such that the molecular axes are oriented in a constant direction. In the subsequent second plane stacking on the first plane inside the layer, the direction of the molecular axes shifts at a slight angle with respect to the direction of the molecular axes in the first plane. In the subsequent third plane further stacking on the second plane, the direction of the molecular axes further shifts at an angle from the direction of the molecular axes in the second plane. In this manner, the angle of the molecular axes in the planes successively shifts (twists) in the planes arranged in a stacked manner. Such a structure in which the direction of the molecular axes twists is usually a helical structure, which is an optically chiral structure.

More specific examples of the material having cholesteric regularity may include a cholesteric resin layer. The cholesteric resin layer is a layer obtained by curing a curable liquid crystal compound in a state of exhibiting a cholesteric liquid crystal phase. The cholesteric resin layer may be obtained, for example, by polymerizing a polymerizable liquid crystal compound in a state where the polymerizable liquid crystal compound is exhibiting a cholesteric liquid crystal phase. More specifically, a cholesteric resin layer may be obtained by applying a liquid crystal composition containing a polymerizable liquid crystal compound onto a suitable substrate or the like to form a layer, giving orientation to the liquid crystal composition to be in a cholesteric liquid crystal phase, and curing the liquid crystal composition.

As the polymerizable liquid crystal compound, a photopolymerizable liquid crystal compound is preferable. As the photopolymerizable liquid crystal compound, a photopolymerizable liquid crystal compound which is polymerizable by irradiation of an active energy ray may be used. As the active energy ray, an energy ray capable of advancing a polymerization reaction of a photopolymerizable liquid crystal compound may be adopted from a wide range of energy rays such as visible light, ultraviolet rays, and infrared rays, and in particular, ionizing radiation such as ultraviolet rays is preferable. Among these, as the photopolymerizable liquid crystal compound suitably used in the cholesteric liquid crystal composition, a rod-like liquid crystal compound having 2 or more reactive groups in one molecule is preferable, and a compound represented by the formula (1) is particularly preferable.

$R^3—C^3\text{-}D^3\text{-}C^5\text{-}M\text{-}C^6\text{-}D^4\text{-}C^4—R^4$ Formula(1)

In the formula (1), $R^3$ and $R^4$ are reactive groups, each independently representing a group selected from the group consisting of a (meth)acrylic group, a (thio)epoxy group, an oxetane group, a thietanyl group, an aziridinyl group, a pyrrole group, a vinyl group, an allyl group, a fumarate group, a cinnamoyl group, an oxazoline group, a mercapto group, an iso(thio)cyanate group, an amino group, a hydroxyl group, a carboxyl group, and an alkoxysilyl group. When the photopolymerizable liquid crystal compound has these reactive groups, it is possible to obtain a liquid crystal composition cured layer having high mechanical strength when the liquid crystal composition is cured.

In the formula (1), $D^3$ and $D^4$ each independently represent a group selected from the group consisting of a single bond, a linear or branched alkyl group of 1 to 20 carbon atoms, and a linear or branched alkylene oxide group of 1 to 20 carbon atoms.

In the formula (1), $C^3$ to $C^6$ each independently represent a group selected from the group consisting of a single bond, —O—, —S—, —S—S—, —CO—, —CS—, —OCO—, $—CH_2—$, $—OCH_2—$, —CH═N—N═CH—, —NHCO—, —O—(C═O)—O—, $—CH_2—$ (C═O)—O—, and $—CH_2O—$(C═O)—.

In the formula (1), M represents a mesogen group. In particular, M represents a group obtained by bonding two to four same or different skeletons selected from the group consisting of azomethines, azoxies, phenyls, biphenyls, terphenyls, naphthalenes, anthracenes, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolanes, and alkenylcyclohexylbenzonitriles, which may or may not be substituted, by a bonding group such as —O—, —S—, —S—S—, —CO—, —CS—, —OCO—, $—CH_2—$, $—OCH_2—$, —CH═N—N═CH—, —NHCO—, —O—(C═O)—O—, $—CH_2—$(C═O)—O—, and $—CH_2O—$(C═O)—.

Examples of the substituents which the mesogen group M may have may include a halogen atom, an alkyl group of 1 to 10 carbon atoms optionally having a substituent, a cyano group, a nitro group, $—O—R^5$, $—O—C(═O)—R^5$, $—C(═O)—O—R^5$, $—O—C(═O)—O—R^5$, $—NR^5—C(═O)—R^5$, $—C(═O)—NR^5R^7$, and $—O—C(═O)—NR^5R^7$. Herein, $R^5$ and $R^7$ represent a hydrogen atom or an alkyl group of 1 to 10 carbon atoms. When $R^5$ and $R^7$ are alkyl groups, the alkyl group may be have an intervening group —O—, —S—, —O—C(═O)—, —C(═O)—O—, —O—C(═O)—O—, $—NR^6—C(═O)—$, $—C(═O)—NR^6—$, $—NR^6—$, or —C(═O)— (except for cases where two or more adjacent —O—'s or —S-'s are present as intervening groups). Herein, $R^6$ represents a hydrogen atom or an alkyl group of 1 to 6 carbon atoms.

Examples of the substituents in the above-mentioned "alkyl group of 1 to 10 carbon atoms optionally having a substituent" may include a halogen atom, a hydroxyl group, a carboxyl group, a cyano group, an amino group, an alkoxy group of 1 to 6 carbon atoms, an alkoxyalkoxy group of 2 to 8 carbon atoms, an alkoxyalkoxyalkoxy group of 3 to 15 carbon atoms, an alkoxycarbonyl group of 2 to 7 carbon atoms, an alkylcarbonyloxy group of 2 to 7 carbon atoms, and an alkoxycarbonyloxy group of 2 to 7 carbon atoms.

It is preferable that the rod-like liquid crystal compound has an asymmetric structure. Herein, the asymmetric structure refers to a structure in which $R^3—C^3\text{-}D^3\text{-}C^5\text{-}M\text{-}$ and $\text{-}M\text{-}C^6\text{-}D^4\text{-}C^4—R^4$ in the formula (1) differ from each other when they are compared with the mesogen group M serving as the center. By using the compound with an asymmetric structure as the rod-like liquid crystal compound, it is possible to further enhance orientation uniformity.

Preferable specific examples of the rod-like liquid crystal compound may include the following compounds (B1) to (B10). However, the rod-like liquid crystal compound is not limited to the following compounds.

(Chemical formula 1)

(B1)

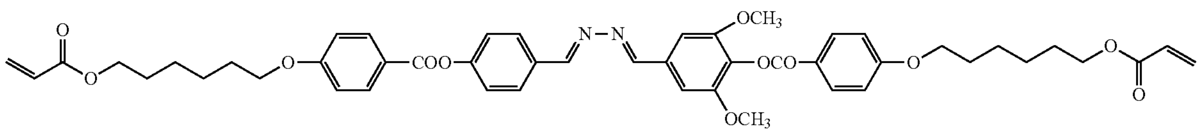

(B2)

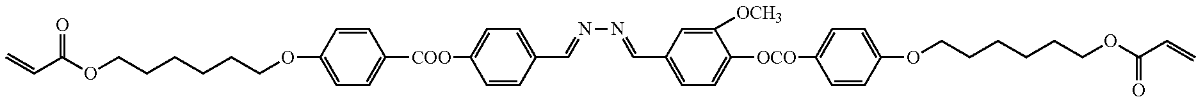

(B3)

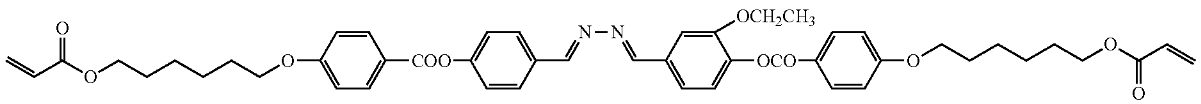

(B4)

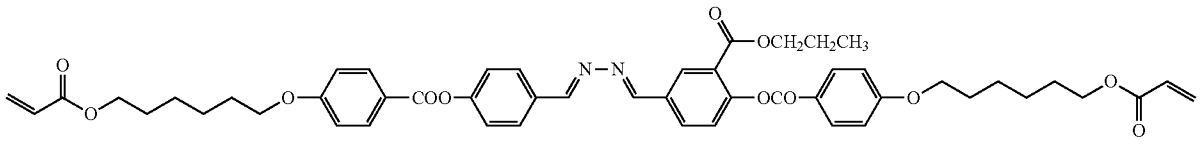

-continued (B5)

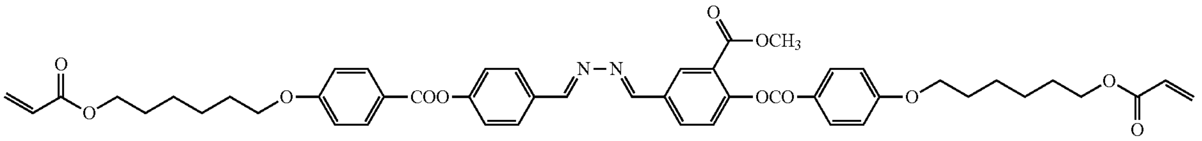

(B6)

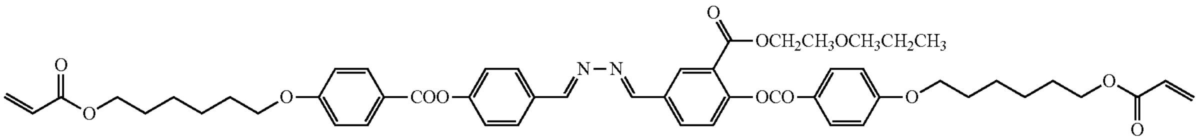

(B7)

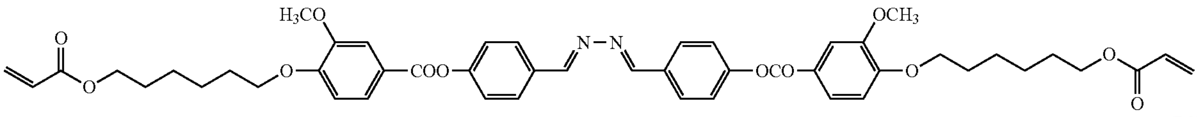

(B8)

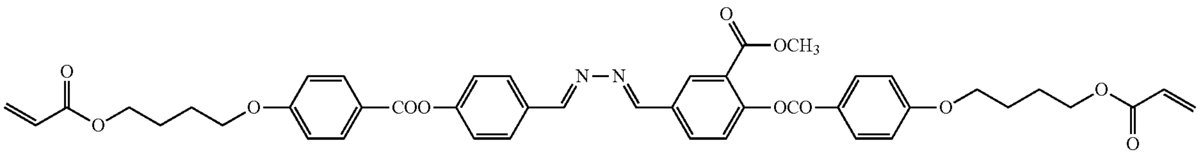

(B9)

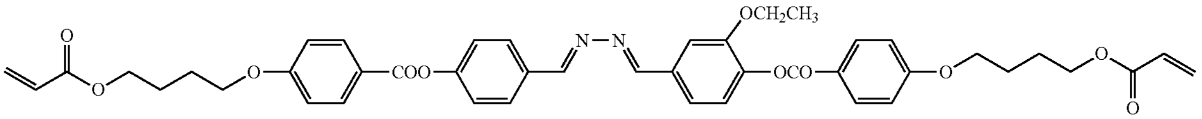

(Chemical formula 2)

(B10)

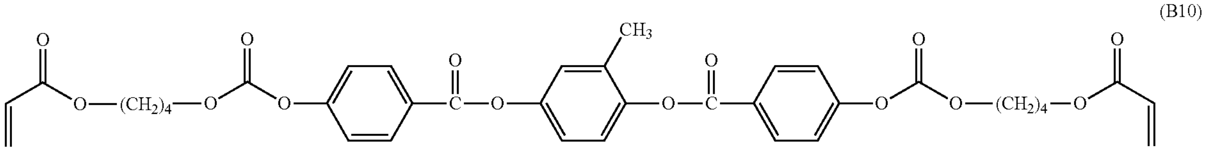

When the liquid crystal composition contains the rod-like liquid crystal compound described above, it is preferable that the liquid crystal composition contains a compound represented by the formula (2) as an orientation aid in combination with the rod-like liquid crystal compound.

$$R^1\text{-}A^1\text{-}B\text{-}A^2\text{-}R^2 \quad (2)$$

In the formula (2), $R^1$ and $R^2$ are each independently selected from the group consisting of a linear or branched alkyl group of 1 to 20 carbon atoms, a linear or branched alkylene oxide group of 1 to 20 carbon atoms, a hydrogen atom, a halogen atom, a hydroxyl group, a carboxyl group, a (meta)acrylic group which may have an optional bonding group as an intervening group, an epoxy group, a mercapto group, an isocyanate group, an amino group, and a cyano group.

The alkyl group and the alkylene oxide group may be unsubstituted or substituted with one or more halogen atoms. In addition, the halogen atom, hydroxyl group, carboxyl group, (meta)acrylic group, epoxy group, mercapto group, isocyanate group, amino group, and cyano group may be bonded to an alkyl group of 1 to 2 carbon atoms and an alkylene oxide group.

Preferable examples of $R^1$ and $R^2$ may include a halogen atom, a hydroxyl group, a carboxyl group, a (meth)acrylic group, an epoxy group, a mercapto group, an isocyanate group, an amino group, and a cyano group.

Furthermore, at least one of $R^1$ and $R^2$ is preferably a reactive group. When the compound represented by the formula (2) has a reactive group as at least one of $R^1$ and $R^2$, the compound represented by the formula (2) is fixed in the liquid crystal composition cured layer upon curing, so that a stronger layer can be formed. Herein, examples of the reactive group may include a carboxyl group, a (meth) acrylic group, an epoxy group, a mercapto group, an isocyanate group, and an amino group.

In the formula (2), $A^1$ and $A^2$ each independently represent a group selected from the group consisting of a 1,4-phenylene group, a 1,4-cyclohexylene group, a cyclohexene-1,4-ylene group, a 4,4'-biphenylene group, a 4,4'-bicyclohexylene group, and a 2,6-naphthylene group. The 1,4-phenylene group, 1,4-cyclohexylene group, cyclohexene-1,4-ylene group, 4,4'-biphenylene group, 4,4'-bicyclohexylene group, and 2,6-naphthylene group are not substituted or may be substituted with one or more substituents such as a halogen atom, a hydroxyl group, a carboxyl group, a cyano group, an amino group, and an alkyl group or a halogenated alkyl group of 1 to 10 carbon atoms. When two or more substituents are present in each of $A^1$ and $A^2$, they may be the same as, or different from, each other.

Particularly preferable examples as $A^1$ and $A^2$ may include groups selected from the group consisting of a 1,4-phenylene group, a 4,4'-biphenylene group, and a 2,6-naphthylene group. When compared to alicyclic skeletons, these aromatic ring skeletons are relatively rigid, and have higher affinity to mesogens of the rod-like liquid crystal compound. Consequently, therewith higher orientation uniformity is obtained.

In the formula (2), B is selected from the group consisting of a single bond, —O—, —S—, —S—S—, —CO—, —CS—, —OCO—, —$CH_2$—, —$OCH_2$—, —CH═N—N═CH—, —NHCO—, —O—(C═O)—O—, —$CH_2$—(C═O)—O—, and —$CH_2O$—(C═O)—.

Particularly preferable examples as B may include a single bond, —O—(C═O)—, and —CH═N—N═CH—.

Particularly preferable specific examples of the compound represented by the formula (2) may include the following compounds (A1) to (A10). As the compounds represented by the formula (2), one type thereof may be solely used, and two or more types thereof may also be used in combination at any ratio.

The weight ratio represented by (total weight of the compound represented by the formula (2))/(total weight of the rod-like liquid crystal compound) is preferably 0.001 or more, more preferably 0.01 or more, and further preferably 0.05 or more, and is preferably 1 or less, and more preferably 0.65 or less. By setting the weight ratio to the above-mentioned lower limit value or more, orientation uniformity of the liquid crystal composition layer can be enhanced. By setting the weight ratio to the upper limit value or less, orientation uniformity can be enhanced. In addition, stability of the liquid crystal phase of the liquid crystal composition can also be increased. Furthermore, the refractive index anisotropy Δn of the liquid crystal composition can thereby be increased, and consequently a liquid crystal composition cured layer having desired optical performance such as selective reflection performance of circularly polarized light can be stably obtained. Herein, the total weight of the compound represented by the formula (2) refers to, in a case where only one type of the compound represented by the formula (2) is used, the weight of the compound, and refers to, in a case where two or more types thereof are used, the (Chemical formula 3)

(A1)

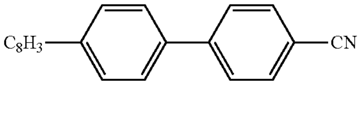

(A2)

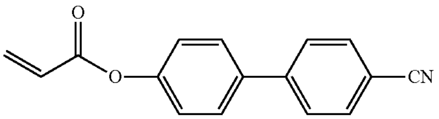

(A3)

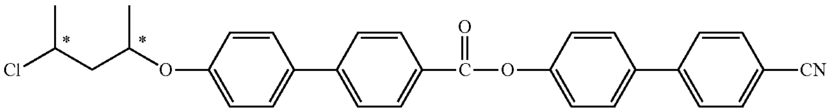

(A4)

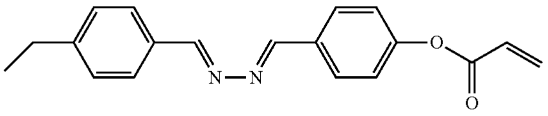

(A5)

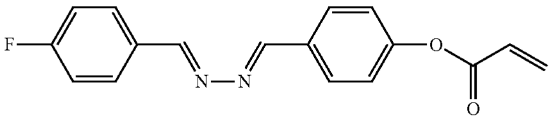

(A6)

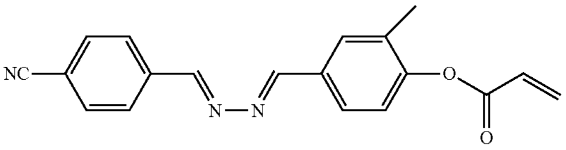

(A7)

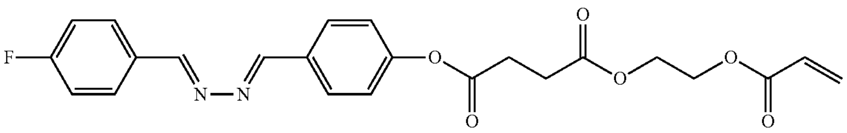

(A8)

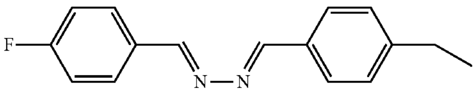

(A9)

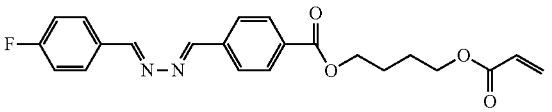

(A10)

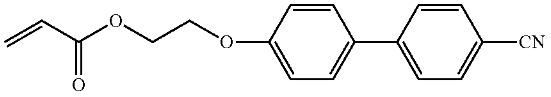

In the above-mentioned compound (A3), "*" represents a chiral center.

total weight of them. Similarly, the total weight of the rod-like liquid crystal compound refers to, in a case where only one type of the rod-like liquid crystal compound is used, the weight of the compound, and refers to, in a case where two or more types thereof are used, the total weight of them.

In a case where the compound represented by the formula (2) and the rod-like liquid crystal compound are used in combination, the molecular weight of the compound represented by the formula (2) is preferably less than 600, and the molecular weight of the rod-like liquid crystal compound is preferably 600 or more. With this combination, the compound represented by the formula (2) can enter the gap of the rod-like liquid crystal compound having a molecular weight larger than that of the compound represented by the formula (2), and orientation uniformity can be improved.

The liquid crystal composition for forming the cholesteric resin layer may further contain an optional component constituting the cholesteric resin layer and a solvent for facilitating handling of the liquid crystal composition. Examples of the optional component may include a chiral agent, a polymerization initiator, and a surfactant. Specific examples of the optional component and the solvent may include those described in Japanese Patent Application Laid-Open No. 2019-188740 A.

Examples of reflection-type linear polarizers may include a film that is a laminate of a large number of thin films (for example, trade name "DBEF", manufactured by 3M Limited) and a wire-grid polarizer.

In either case wherein the light reflection layer is a reflection-type circular polarizer or wherein is a reflection-type linear polarizer, the reflectance ratio of unpolarized light which has been incident on the light reflection layer and reflected by the light reflection layer is at most 50%. Depending on the range and reflectance ratio of the reflection, the light reflection layer exhibits a variety of visually observable colors. In a case where the reflectance ratio of the unpolarized light having been incident on the light reflection layer and reflected by the light reflection layer is 35 to 50% at all wavelengths in the wavelength region of 420 nm to 650 nm, the light reflection layer is observed as a silver layer. In a case where the range over which 35 to 50% of the reflection is achieved is narrower than this, the light reflection layer can exhibit different colors depending on the range. For example, when the reflection range is near 450 nm, when it is near 550 nm, and when it is near 650 nm, colors of blue, green, and red, respectively, may be exhibited.

The identification medium of the present invention may have only one layer as the light reflection layer, or may have a large number of layers. The identification medium may have only one type of layer as the light reflection layer, or may have a plurality of types of layers giving different polarization states to the reflected light. For example, the identification medium may include a plurality of cut pieces of reflection-type polarizers, which exhibit a plurality of colors, such as red, green, blue, and silver, that are arranged in a state in which a large number of pieces of reflection-type polarizers are laid in a horizontal direction as the light reflection layer. When the light reflection layer has a large number of cut pieces as described above, it is preferable that the light reflection layer is a reflection-type circular polarizer. In a case where a reflection-type circular polarizer is used in the principle illustrated in FIGS. 1 to 6, the reflection-type circular polarizers do not have to align their orientation in one direction, and the direction in which they become bright is regulated only by the slow axis of the phase difference layer. Thus, even when the reflection-type circular polarizer is formed as minute cut pieces and the pieces are disposed so that the orientation is not unified within the identification medium, it is possible to easily constitute an identification medium that achieves the advantageous effects of the present invention.

From the viewpoint of clarifying the visibility of the latent image, it is preferable that the light reflection layer may be a silver layer, or a combination of a silver layer and a layer of another color.

(Specific Example of Patterned Phase Difference Layer)

The patterned phase difference layer is a layer that includes an area having a phase difference. The area having a phase difference occupies a partial area of the display surface of the identification medium.

Examples of the phase difference layer (the area in the patterned phase difference layer corresponding to the area having a phase difference) may include an area that functions as a λ/4 wave plate such as the aforementioned layer 102(Xy) and an area that functions as a λ/2 wave plate such as the aforementioned layer 202(Xy).

Examples of a material constituting the phase difference layer may include various solid materials having optical anisotropy. As one of the examples, a stretched film obtained by stretching a transparent material may be mentioned. More specifically, a film obtained by stretching an optically isotropic film to impart an in-plane retardation Re so that the film can function as a λ/4 wave plate or a λ/2 wave plate may be mentioned. The stretched film is preferable as the stretched film is relatively inexpensively obtainable, and provision of Re of a desired value thereto and molding thereof in a desired appropriate shape can be easily performed.

Another example of a material constituting the phase difference layer is a cured product of a liquid crystal compound. More specifically, the material is a curable liquid crystal compound, and the layer thereof is a layer obtained by curing the material which has been oriented in a liquid crystal state exhibiting a phase difference so that the layer can function as a λ/4 wave plate or a λ/2 wave plate. Examples of such a layer and a method for producing the same may include those described in International Publication No. 2019/116995. With the cured product of the liquid crystal compound, a sole piece of film having an area and another area which have different phase differences can be easily formed. Therefore use thereof is particularly preferable in a case where, as the patterned phase difference layer, a sole piece of film is required to be formed.

As a preferable example, the identification medium may include as the patterned phase difference layer one or more single patterned phase difference layers. Herein, the single patterned phase difference layer is a member having a smaller size than that of the display surface of the identification medium, and consisting of a single area of a certain phase difference. By disposing the single patterned phase difference layer within the display surface of the identification medium, the area at which the layer exists can function as an area having a phase difference, and the other area can function as an isotropic area.

In the display surface of a single identification medium, only one area or a plurality of areas having a phase difference of the patterned phase difference layer may be provided. In a case where the single identification medium includes a plurality of areas, the directions of the slow axes of these areas may be the same as or different from one another.

In a case where the identification medium has a plurality of areas having different directions of the slow axes as areas having a phase difference, a design effect can be obtained based on this structure. Specifically, it is possible to obtain a design effect in which the plurality of areas sequentially become brighter one by one upon changing the relative angular relationship between the identification medium and the observational linear polarizer or the relative angular relationship between the identification medium and the vibration direction of the incident linearly polarized light. Also, the identification medium in which any of the plurality of areas is the brightest in multiple directions can be constituted, and it is consequently possible to constitute an identification medium in which a latent image is observed from any angle without limiting the orientation of the identification medium and the orientation of the observational linear polarizer. Such an effect cannot be obtained from an easily duplicable article obtained by a general technique such as printing, and such an effect is visually recognizable as a feature characteristic of an authentic identification medium. Therefore, in this case, the anti-counterfeit performance and the identification function of the identification medium can particularly be improved. The directions of the slow axes of the plurality of areas may be regularly different or irregularly different.

An example of a method for constituting a plurality of areas having different directions of the slow axes as the areas having a phase difference may include a method of preparing a plurality of single patterned phase difference layers and disposing these so that the directions of the slow axes may differ from one another in the display surface of a single identification medium. With such a method, a plurality of areas having different directions of the slow axes can easily be constituted. Also, with such a method, the directions of the slow axes of the plurality of areas can easily be arranged in an irregular state. More specifically, the layout of the irregularly different slow axes can be achieved by preparing a large number of single patterned phase difference layers and disposing or scattering the layers on the light reflection layer at random. By constituting the layout of the irregularly different slow axes in this manner, it is possible to obtain a design effect in which the plurality of areas sequentially become brighter one by one in random order upon changing the relative angular relationship between the identification medium and the observational linear polarizer or the relative angular relationship between the identification medium and the vibration direction of the incident linearly polarized light. Consequently, the anti-counterfeit performance, the identification function, and the design value of the identification medium can further be improved.

In a case where a plurality of areas having different directions of the slow axes are constituted as the areas having a phase difference, the combination of the light reflection layer and the patterned phase difference layers is preferably a combination of a reflection-type circular polarizer and phase difference layers each including an area functioning as a $\lambda/4$ wave plate. In this case, the relative orientations of the directions of the slow axes of the patterned phase difference layers with respect to the light reflection layer are not required to be adjusted, and the orientations of the slow axes of the plurality of areas can thus be easily set in arbitrary directions.

(Optional Components)

The identification medium of the present invention may include optional components in addition to the light reflection layer and the patterned phase difference layer. Examples of the optional components may include a light absorption layer, a diffusion layer, a high phase difference layer, a transparent resin for embedding, a decorative member, and a mounting member.

The light absorption layer is a layer that absorbs incident light. The light absorption layer may be a layer having black color. The material of the light absorption layer may be any material, and may be, for example, a black colored film. The light absorption layer may be provided on the back side of the light reflection layer, i.e., on the side of the light reflection layer opposite to the viewing side. In a case where the light reflection layer is either a reflection-type circular polarizer or a reflection-type linear polarizer, almost all the light that has not been reflected among the incident light is transmitted therethrough. When the light absorption layer is provided on the back side of the light reflection layer, the transmitted light is absorbed, and as a result, the effect of the reflected light can be visually recognized more clearly. On the other hand, when the light absorption layer is not provided on the back side of the light reflection layer, the back side of the light reflection layer is visually recognized, and the effect of the reflected light becomes unclear. However, thereby a design effect that the identification medium can be used as a see-through object can be obtained.

The diffusion layer is a layer that transmits the incident light in a state of being diffused. The diffusion layer may be provided at a position on a side closer to the viewing side than the patterned phase difference layer. By providing the diffusion layer, it is possible to widen the viewing angle at which the latent image is visually recognized. As the diffusion layer, various layered structures that can function as a known diffusion layer may be used. Specifically, a layer of a cured product of a resin containing light diffusing fine particles may be used. Such a layer may be formed on the surface of a transparent film and provided to the identification medium of the present invention as a composite film with the transparent film.

The high phase difference layer is an area having a higher phase difference than an area having a phase difference in the patterned phase difference layer. Such a high phase difference layer usually exhibits greatly different phase difference depending on the wavelength of the incident light. Therefore, in normal observation, the layer can be visually recognized as a transparent layer, while in latent image observation, the layer can be visually recognized as a colored layer due to interference color. Therefore, by providing the high phase difference layer in the display surface of the identification medium, it is possible to obtain a design effect of exhibiting color only in the observation of the latent image. Examples of the material constituting the high phase difference layer may include an ordinary stretched transparent film. For example, a cellophane tape for bonding, or a stretched cellophane tape may be used. The position where the high phase difference layer is provided in the identification medium is not particularly limited, and may be any position at which the layer can exhibit the above-mentioned colors.

The decorative member is a member that does not contribute to the expression of functions of the identification medium, but can contribute to the design effect of the identification medium. An example of a decorative member includes a cut piece having a metallic luster, referred to as a lamé. Such cut pieces may be provided, for example, side by side with cut pieces of the light reflection layer, or may be stacked on the upper surface of the light reflection layer. Other examples of the decorative member may include a transparent member such as cover glass covering the display surface of the identification medium, and a housing such as a tray for decorating or protecting the periphery of the identification medium.

The various members constituting the identification medium, such as those described above, may be formed as an integrated member by embedding a part or all of these members in an embedding transparent resin. Such embedding also makes it possible to reduce the visibility of, for example, the edge portion of the phase difference layer in the observation with the naked eye, as a result of which it is possible to further enhance the advantageous effects of the identification medium that the latent image is observed only in special observations.

Examples of the transparent resin for embedding may include an acrylic resin, an epoxy-based resin, a polyester-based resin, and a silicone-based resin. As the resin for embedding, various types of resins commercially available as a curable resin liquid may be used. Specifically, a resin liquid, which can be processed to be a solid transparent resin by irradiating it with energy rays such as ultraviolet rays, may be used. Among these, for example, when an acrylic transparent resin is used, a hard identification medium without flexibility is obtained. On the other hand, when a silicone-based transparent resin is used, the obtained identification medium becomes soft and flexible, and can be used as a flexible badge called a silicone badge.

Other examples of the resin for embedding may include a film-like resin material. Specifically, the identification medium may be constituted by sandwiching the light reflection layer, the patterned phase difference layer, and an optional component, if necessary, between a pair of film-like resin materials or a combination of a film-like resin material and another sheet-like material, and attaching them to seal the internal components. More specifically, a film-like identification medium may be constituted by providing and sealing components such as the light reflection layer, the patterned phase difference layer, and the like between a base paper, which is formed of paper, a resin material, or a combination thereof, and a resin film such as an acrylic film having a small phase difference. Furthermore, by using one having a tackiness agent layer on the back surface as the base paper, it is possible to easily constitute an identification medium which can be used as a sticker.

By embedding the components in a transparent resin, the identification medium can be produced as a plate-shaped product. However, processing such as perforating and chamfering may be further performed thereon to obtain an optional shape other than a plate shape.

The mounting member is a member that functions when the identification medium is attached to an article. Part or all of the mounting member may also serve as a decorative member. Examples of the mounting members may include members, such as rings, clasps, hooks, wires, chains, strings, and the like, which extend from the periphery of the identification medium, and enclosures, such as trays, which also serve as a decorative member. The mounting member may be directly attached to the light reflection layer and/or the patterned phase difference layer, which are essential components of the identification medium, or may be bonded via an optional member other than these. Bonding with the mounting member may be achieved by any of adhesion by an adhesive agent, adhesion by a welder process, mechanical bonding such as screwing or ligating, and the like.

(Specific Example of Identification Medium)

A more specific example of the identification medium of the present invention will be described with reference to FIGS. 11 and 12.

Figure 11:
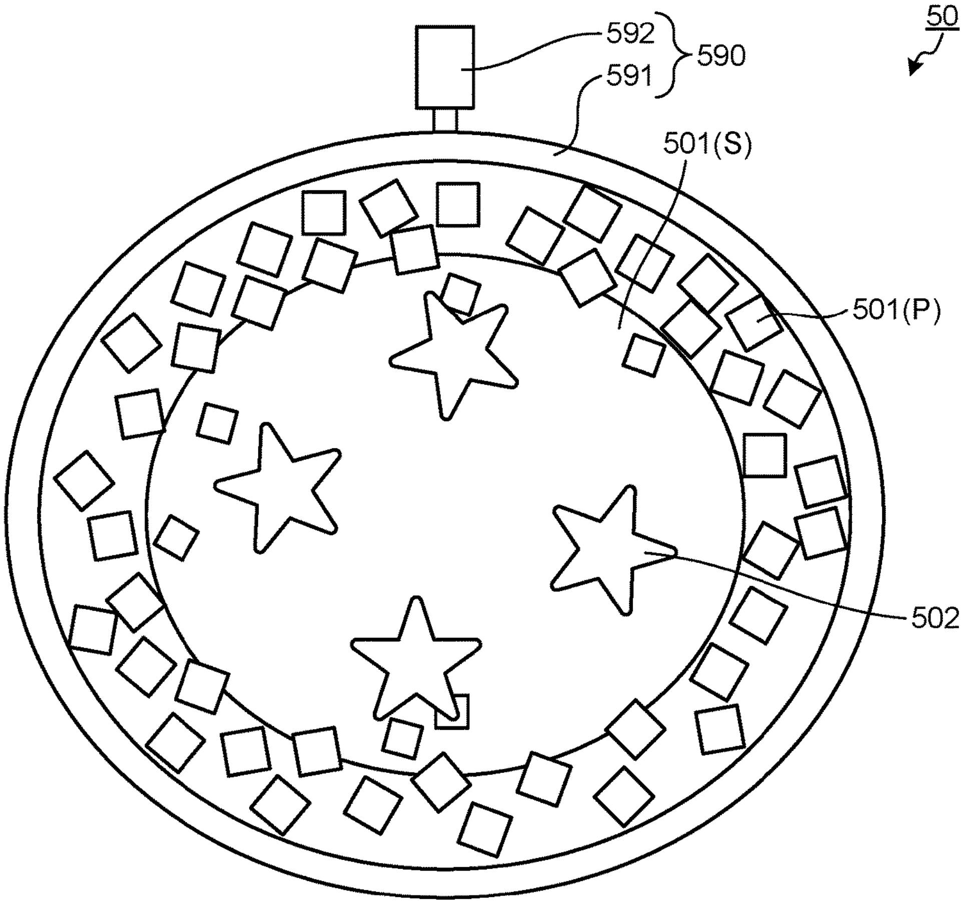
FIG. 11 is a top view schematically illustrating a specific example of the identification medium of the present invention.
Figure 12:
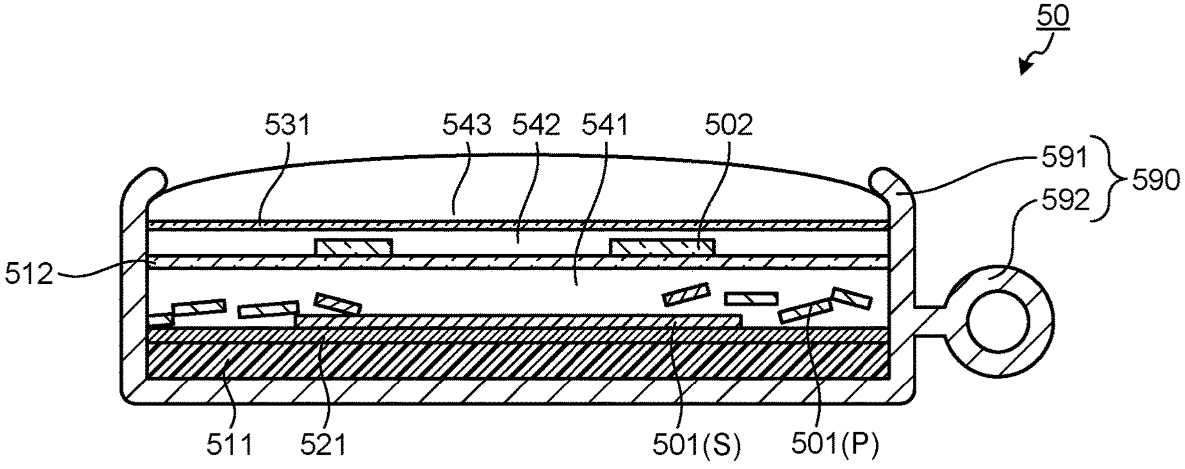
FIG. 12 is a vertical cross-sectional view of the identification medium illustrated in FIG. 11.

FIG. 11 is a top view schematically illustrating a specific example of the identification medium of the present invention, and FIG. 12 is a vertical cross-sectional view of the identification medium illustrated in FIG. 11.

In FIGS. 11 and 12, an identification medium 50 includes a mounting member 590 and various components provided in the mounting member 590 to express the function as the identification medium. In FIGS. 11 and 12, the identification medium 50 is illustrated in a state of being placed horizontally with the display surface thereof facing upward. The mounting member 590 includes a tray 591 and a ring 592 provided at the edge portion of the tray 591. The ring 592 functions as a member for connecting the identification medium to an article or a string-shape member connecting the identification medium to the article upon attaching the identification medium to the article.

In the tray 591, a substrate 511 and a light absorption layer 521 are provided in order from the bottom portion of the tray 591. In this example, on the upper portion of the light absorption layer 521, a silver light reflection layer 501(S) and cut pieces of a light reflection layer 501(P) are disposed as light reflection layers to be arrayed in a partially overlapped state. In this example, these layers are all reflection-type circular polarizers. Each of the light reflection layers 501(P) may be a silver layer or a red, green, blue, or the like colored layer.

On the upper portion of the light reflection layers 501(S) and 501(P), four phase difference layers 502 are further provided. In this example, the phase difference layers 502 are star-shaped λ/4 wave plates occupying a partial area of the display surface of the identification medium 50 and are provided as members positioned and bonded on a transparent substrate 512. The slow axes of the four phase difference layers 502 are positioned to be in different directions from each other.

On the upper portion of the phase difference layers 502, a diffusion film 531 including a diffusion layer is disposed. In this example, the diffusion film 531 is provided in a state of covering the entire area of the display surface of the identification medium 50.

In this example, the light reflection layer 501(S), the light reflection layers 501(P), the transparent substrate 512, the phase difference layers 502, and the diffusion film 531 are embedded by a transparent resin, thereby forming transparent resin portions 541, 542, and 543.

The identification medium 50 functions by the same principle as that of the identification medium 100 illustrated in FIGS. 1 to 6. Specifically, in addition to observation of the display surface with the naked eye under the environment in which ordinary unpolarized light is made incident, observation of the display surface via the observational linear polarizer in a state in which unpolarized light is made incident, observation of the display surface in a state in which linearly polarized light is made incident, or both of the observation methods may be performed. In the observation via the observational linear polarizer in a state in which unpolarized light is made incident, and in the observation in a state in which linearly polarized light is made incident, the azimuth angle of the identification medium is rotated by 360° about the vertical direction as an axis, and the identification medium may be observed in the vertical direction.

In the observation with the naked eye, colors due to reflection by the light reflection layer 501(S) and the light reflection layers 501(P) are visually recognized in the display surface. Since the phase difference layers 502 are visually recognized as transparent members and are embedded in the transparent resin, the outlines thereof are almost visually unrecognizable. The difference in brightness between the areas occupied by the phase difference layers 502 and the other area is not visually recognized and does not change even with rotation.

On the other hand, in the observation via the observational linear polarizer in a state in which unpolarized light is made incident, and in the observation in a state in which linearly polarized light is made incident, the star shapes of the phase difference layers 502 are visually recognized. The difference in brightness between the areas occupied by the phase difference layers 502 and the other area of the display surface changes with rotation. The azimuth angles of the plurality of phase difference layers 502 at which the phase difference layers 502 are the brightest are irregularly different, which brings about a design effect in which the plurality of stars sequentially become brighter one by one due to rotation.

(Specific Example of Identification Medium: Modification Example)

In the identification medium 50 illustrated in FIGS. 11 and 12, the star-shaped layers are used as the phase difference layers, although the shape of the phase difference layer is not limited to this shape and may be any optional shape such as various graphics and characters.

In the identification medium 50 illustrated in FIGS. 11 and 12, the back side of the light reflection layer is provided with non-translucent members such as the bottom portion of the tray 591 and the light absorption layer 521. However, without providing these members, a see-through identification medium in which the back side of the light reflection layer is visually recognized via the identification medium may be constituted. In this case, another patterned phase difference layer may additionally be provided on the back side of the light reflection layer. In this case, an identification medium in which different latent images are observed from the front side and from the back side can be constituted.

(Article)

The article of the present invention includes the identification medium of the present invention.

Examples of the article may include various articles such as clothes, shoes, a hat, an accessory, a jewelry good, and a daily articles. The article of the present invention can be one having an identification function imparted by the provision of the identification medium. By having such an identification function, the identification medium and the article can be identified as non-counterfeit authentic ones. In addition, the identification medium can give a design effect to the article. The identification medium may be put to the article as an accessory, part, or attachment of the article such as a tag, a charm, a badge, and a sticker.

The article of the present invention may also include a polarizer viewer in addition to the identification medium of the present invention. An example of the polarizer viewer may be one that includes an observational polarizer such as the aforementioned observational linear polarizer and observational circular polarizer and that is attached to the article so that the identification medium can be observed via the observational polarizer. The polarizer viewer may be in a tag shape, for example, so as to be attached to the article main body via a string or the like. In this manner, by further providing the polarizer viewer in addition to the identification medium, general article users can easily identify the identification medium.

EXAMPLES

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of weight, unless otherwise specified. The operation described below was performed under the conditions of normal temperature and normal pressure in the atmospheric air, unless otherwise specified.

Preparation Example 1: Cholesteric Materials (R)(G)(B)

A liquid crystal compound (trade name "Paliocolor LC242", manufactured by BASF Co., Ltd.), a chiral agent (trade name "Paliocolor LC756", manufactured by BASF Co., Ltd.), a photopolymerization initiator (trade name "Irgacure OXE02", manufactured by BASF Co., Ltd.), a leveling agent (trade name "Surflon S420", manufactured by AGC Seimi Chemical Co., Ltd.), and a solvent (methyl ethyl ketone) were mixed in the proportions shown in Table 1 below to obtain liquid crystal compositions (R), (G), and (B).

TABLE 1

| Product name | (B) | (G) | (R) |
|---|---|---|---|
| Paliocolor LC242 | 17.90 | 18.10 | 18.31 |
| Paliocolor LC756 | 1.48 | 1.28 | 1.07 |
| Irgacure OXE02 | 0.60 | 0.60 | 0.60 |
| Surflon S420 | 0.02 | 0.02 | 0.02 |
| MEK | 80.00 | 80.00 | 80.00 |

All proportions shown in weight parts

The surface of the primary substrate (PET film, manufactured by Toyobo Co., Ltd., trade name "A4100") was subjected to a rubbing treatment. On the surface, each of the liquid crystal compositions (R), (G), and (B) was applied by a bar coater to form a layer of the liquid crystal composition. The thickness of the layer of the liquid crystal composition was adjusted so that the thickness of the cholesteric material layer finally obtained was 3.5 μm. This was heated in an oven at 100° C. for 2 minutes to dry and to give orientation to the layer of liquid crystal composition. Subsequently, under a nitrogen gas atmosphere (oxygen concentration: 400 ppm or less), the layer of the dried liquid crystal composition was irradiated with ultraviolet rays. For the irradiation, a high-pressure mercury lamp was used, and the irradiation condition was adjusted so that the illuminance at 365 nm (i-line) was 280 $mW/cm^2$ and the exposure dose was 2000 $mJ/cm^2$. As a result, polymerization in which the residual monomer proportion was about 2% by weight was achieved, and the layer of the liquid crystal composition was cured to form a cholesteric material layer. In this manner, a primary sheet including the primary substrate and the cholesteric material layer was obtained.

Production Example 2: Cholesteric Material (S)

14.63 parts by weight of a liquid crystal compound (a compound represented by the above-described formula (B3)), 3.66 parts by weight of an orientation aid (a compound represented by the above-described formula (A2)), 1.09 parts by weight of a chiral agent (trade name "Paliocolor LC756", manufactured by BASF Co., Ltd.), 0.02 part by weight of a leveling agent (trade name "Surflon 5420", manufactured by AGC Seimi Chemical Co., Ltd.), 0.60 part by weight of a photopolymerization initiator (trade name "Irgacure OXE02", manufactured by BASF Co., Ltd.), and 80.00 parts by weight of a solvent (methyl ethyl ketone) were mixed to obtain a liquid crystal composition (S).

The surface of the primary substrate (PET film, manufactured by Toyobo Co., Ltd., trade name "A4100") was subjected to a rubbing treatment. On the surface thereof, the liquid crystal composition (S) was applied by a bar coater to form a layer of the liquid crystal composition. The thickness of the layer of the liquid crystal composition was adjusted so that the thickness of the cholesteric material layer finally obtained was about 5 μm. This was heated in an oven at 140° C. for 2 minutes to dry and to give orientation to the layer of the liquid crystal composition.

Subsequently, a band-broadening treatment was performed. The band-broadening treatment was performed by irradiating the layer of the dried liquid crystal composition with weak ultraviolet rays in an atmospheric air and then heating the layer. For the UV irradiation, a high-pressure mercury lamp was used, and the irradiation was performed for 0.3 second with an illuminance of 25 $mW/cm^2$ at 365 nm (i-line). After that, heating was performed at 90° C. for 1 minute.

Subsequently, under a nitrogen gas atmosphere (oxygen concentration: 400 ppm or less), a layer of the dried liquid crystal composition was irradiated with ultraviolet rays for curing. For the irradiation, a high-pressure mercury lamp was used, and the irradiation condition was adjusted so that the illuminance at 365 nm (i-line) was 280 $mW/cm^2$ and the exposure dose was 2000 $mJ/cm^2$. As a result, the layer of the liquid crystal composition was cured, and a cholesteric material layer (S) was formed. In this manner, a primary sheet including the primary substrate and the cholesteric material layer (S) was obtained.

Preparation 3: Film Piece of Cholesteric Material

The primary sheets including the cholesteric material layer obtained in Production Examples 1 and 2 were bent and blown with air, whereby the cholesteric material layer was peeled off to obtain peeled pieces. The peeled pieces were ground with a mixer to form film pieces which were cut pieces with a longer diameter of about 2 mm. In this manner, film pieces (R), (G), (B) and (S) of cholesteric material were obtained.

Production Example 4: Cholesteric Material Layer Sheet

The surface on the cholesteric material layer side of the primary sheet including the cholesteric material layer obtained in Production Examples 1 and 2 and another substrate ("ZEONOR ZF-14", manufactured by ZEON Corporation, with a thickness of 23 μm) different from the primary substrate were attached to each other via an ultraviolet-curable adhesive agent (Alonics UCX-800, manufactured by Toagosei Co., Ltd.), and the primary substrate was peeled to transfer the cholesteric material layer. In this manner, cholesteric material layer sheets (R), (G), (B), and (S) including the substrate and the cholesteric material layer provided on the surface thereof via an adhesive layer were obtained.

Preparation 5: Flakes of Cholesteric Material

The cholesteric material layer sheet obtained in Preparation Example 4 was cut into cut pieces having random shapes by a cutter to obtain flakes. In this manner, flakes (R), (G), (B), and (S) of cholesteric materials were obtained.

(Preparation 6: Pigment (S) of Cholesteric Material)

The primary sheet including the cholesteric material layer obtained in Production Example 2 was bent and blown with air, whereby the cholesteric material layer was peeled off to obtain peeled pieces. The peeled pieces were ground with a cutter mill and passed through a 51-μm sieve, and particles having passed through the sieve were collected to obtain a pigment (S) of the cholesteric material. The particle size distribution of the pigment was measured by a laser diffraction/scattering method using a particle size distribution measuring device (product name "LA-960", manufactured by Horiba, Ltd.), and the average particle size of the pigment particle was determined. The average particle size was 30 μm.

Production Example 7: Phase Difference Layer: λ/4 Stretched Resin Film

Resin films (trade name "ZEONOR ZD-12", manufactured by ZEON Corporation, with a thickness of 55 μm, Re(450) of 141 nm, Re(550) of 140 nm, and Re(650) of 140 nm) which had been stretched and had a phase difference were prepared. This resin film was punched by a craft punch to obtain a λ/4 stretched resin film having a star shape, which was used as a phase difference layer.

Production Example 8: Phase Difference Layer: λ/4 Liquid Crystal Cured Product Film With the use of the method described in Comparative Example 5 of International Publication No. 2019/116995, a multilayer film A including a supporting substrate and a layer A, which was formed of a cured product of a liquid crystal composition and which was provided on the supporting substrate, was obtained.

The obtained multilayer film A was punched by a craft punch to obtain a film piece having a star shape. The Re of the portion of the layer A of the film piece of the obtained multilayer film was found to be Re(450) of 120 nm, Re(550) of 145 nm, and Re(650) of 151 nm.

Manufacturing Example 9: Patterned Phase Difference Layer: λ/4-Isotropic Composite Layer 14.78 parts by weight of a liquid crystal compound (trade name "Paliocolor LC242", manufactured by BASF Co., Ltd.), 3.70 parts by weight of a polyfunctional acrylate (trade name "A-TMPT", manufactured by Shin-Nakamura Chemical Industry Co., Ltd.), 2.13 parts by weight of a leveling agent (trade name "Surflon 5420", manufactured by AGC Seimi Chemical Co., Ltd.), 0.39 part by weight of a polymerization initiator Irgacure 184 (manufactured by BASF Co., Ltd.), 0.19 part by weight of a polymerization initiator Irgacure 907 (manufactured by BASF Co., Ltd., and 77.89 parts by weight of a solvent (methyl ethyl ketone) were mixed to obtain a liquid crystal composition.

The surface of the substrate film (trade name "ZEONOR ZF16", with a thickness of 55 μm, optically isotropic film) was subjected to a corona treatment and a rubbing treatment. On the surface thereof, the liquid crystal composition was applied by a bar coater to form a layer of the liquid crystal composition. The thickness of the layer of the liquid crystal composition was adjusted so that the thickness of the patterned phase difference layer finally obtained was about 1.3 μm. This was heated in an oven at 100° C. for 2 minutes to dry and to give orientation to the layer of the liquid crystal composition to obtain a multilayer product 2 including the substrate film and the layer of the dried liquid crystal composition provided thereon.

Two masks were prepared, negative and positive. Each of these has a pattern shape of the same contour in which a plurality of star shapes are arranged. The negative mask is a mask in which the inside of the star shape shields light and the outside of the star shape transmits light, and the positive mask is a mask in which the inside of the star shape transmits light and the outside of the star shape shields light.

Subsequently, the layers of the liquid crystal compositions were irradiated with weak ultraviolet rays (10 $mJ/cm^2$) under a nitrogen gas atmosphere. The irradiation was performed through a positive mask. After that, the multilayer product 2 was placed on a heat plate at 110° C. for 1 minute, so that the unexposed portion was made into an isotropic phase.

Subsequently, under a nitrogen gas atmosphere, the entire surface of the layer of the liquid crystal composition was irradiated with ultraviolet rays (500 $mJ/cm^2$) for main curing, so that the entire surface of the layer of the liquid crystal composition was cured. In this manner, a multilayer product 3 including the substrate film and the λ/4-isotropic composite layer disposed thereon was obtained.

Re was measured for each of the inner area and the outer area of the star-shaped figure of the obtained multilayer product 3, and it was found that, in the inner area, Re(450) was 160 nm, Re(550) was 146 nm, and Re(650) was 140 nm, and Re in the outer area was 0 nm at any wavelength. Therefore, it was confirmed that the inner area functions as a λ/4 wave plate and the outer area functions as an isotropic layer.

Manufacturing Example 10: Patterned Phase Difference Layer: λ/4-λ/2 Composite Layer A multilayer product 4 including a substrate film and a λ/4-isotropic composite layer disposed thereon was obtained by the same manner as that in Production Example 9 except that a negative mask was used instead of the positive mask as a mask.

The surface of the multilayer product 4 on the side of the λ/4-isotropic composite layer and the same resin film as those used in Production Example 7 were attached to each other via an adhesive agent ("CS9621T" manufactured by Nitto Denko Corp.). Upon attaching, the orientations of the slow axes of the λ/4-isotropic composite layer and the resin film were aligned so that they were in the same direction. In this manner, a multilayer product 5 including the substrate film, the λ/4-isotropic composite layer disposed thereon, and the resin film disposed thereon was obtained.

Re was measured for each of the inner area and the outer area of the star-shaped figure of the obtained multilayer product 5, and it was found that, in the inner area, Re(450) was 141 nm, Re(550) was 140 nm, and Re(650) was 140 nm, and in the outer area, Re(450) was 201 nm, Re(550) was 286 nm, and Re(650) was 280 nm. Therefore, it was confirmed that the inner area functions as a λ/4 wave plate and the outer area functions as a λ/2 wave plate.

Preparation Example 11: Phase Difference Layer: λ/2 Stretched Resin Film

Two resin films that were the same as those used in Production Example 7 were attached to each other via an adhesive agent ("CS9621T" manufactured by Nitto Denko Corp.). Upon attaching, the orientations of the slow axes of these two resin films were aligned so that they were in the same direction. This multilayered resin film was punched out by a craft punch to obtain a λ/2 stretched resin film having a star shape for use as a phase difference layer.

Production Example 12: Isotropic Resin Film

An optically isotropic resin film (PET film, manufactured by Toyobo Co., Ltd., trade name "A4100") was punched out with a craft punch to obtain an isotropic resin film having a star shape for use in Comparative Example.

Example 1

(1-1. Light Reflection Layer)

A light absorption layer (a black PET film, which will also be used hereinafter) was placed horizontally, and to the upper surface thereof, the cholesteric material layer sheet (G) obtained in Production Example 4 was attached as a light reflection layer via an adhesive agent.

(1-2. Phase Difference Layer)

Furthermore, a plurality of λ/4 stretched resin films having a star shape obtained in Production Example 7 were attached as a phase difference layer via an adhesive agent so as to cover a partial area of the surface of the light reflection layer. The plurality of λ/4 stretched resin films were disposed in a state in which their slow axis directions were not aligned and were randomly oriented in various directions. In this manner, an identification medium including the light absorption layer, the light reflection layer, and the phase difference layers was obtained.

(1-3. Observation)

An observer rotated the azimuth angle of the identification medium by 360° while keeping a state where the identification medium was placed horizontally and observed the identification medium in the vertical direction. As the observation, both observation with the naked eye and observation via a linear polarizer of polarized sunglasses were performed. The observation was performed in a bright room with a fluorescent lamp as a light source.

In the observation with the naked eye, a green color due to reflection by the cholesteric material layer sheet (G) was visually recognized in the display surface. The phase difference layers were visually recognized as transparent members, and the star shapes were almost visually unrecognizable. The difference in brightness between the areas of the star shapes and the other area on the display surface was not visually recognized and did not change even with rotation.

On the other hand, in the observation via polarized sunglasses, the star shapes of the phase difference layers were visually recognized. The difference in brightness between the areas of the star shapes and the other area on the display surface changed with rotation. Since the azimuth angles of the plurality of phase difference layers at which the phase difference layers were the brightest were different from each other, a design effect in which the plurality of star shapes sequentially became brighter one by one in random order due to rotation was obtained.

Example 2

An identification medium was obtained and observed by the same manner as that of Example 1 except that the cholesteric material layer sheet (S) was used as the light reflection layer instead of the cholesteric material layer sheet (G).

In the observation with the naked eye, a silver color due to reflection by the cholesteric material layer sheet (S) was visually recognized in the display surface. The phase difference layers were visually recognized as transparent members, and the star shapes were almost visually unrecognizable. The difference in brightness between the areas of the star shapes and the other area on the display surface was not visually recognized and did not change even with rotation.

On the other hand, in the observation via polarized sunglasses, the star shapes of the phase difference layers were visually recognized. The difference in brightness between the areas of the star shapes and the other area on the display surface changed with rotation. Since the azimuth angles of the plurality of phase difference layers at which the phase difference layers were the brightest were different from each other, a design effect in which the plurality of star shapes sequentially became brighter one by one in random order due to rotation was obtained. Due to the reflection of the silver light, the shapes of the phase difference layers and the change of brightness thereof were visually recognized more clearly than in Example 1.

Example 3

(3-1. Light Reflection Layer)

An adhesive agent was applied onto the upper surface of the light absorption layer horizontally placed. The small film pieces (R), (G), (B), and (S) obtained in Production Example 3 were disposed thereon in a mixed manner and adhesion of the pieces was effected, thereby forming a light reflection layer which was a layer in which the small film pieces (R), (G), (B), and (S) were mixed.

(3-2. Phase Difference Layer)

Furthermore, a plurality of λ/4 stretched resin films having a star shape obtained in Production Example 7 were attached as a phase difference layer via an adhesive agent so as to cover a partial area of the surface of the light reflection layer. The plurality of λ/4 stretched resin films were disposed in a state in which their slow axis directions were not aligned and were randomly oriented in various directions. In this manner, an identification medium including the light absorption layer, the light reflection layer, and the phase difference layers was obtained.

(3-3. Observation)

The identification medium obtained in (3-2) was observed by the same manner as that of (1-3) of Example 1.

In the observation with the naked eye, a state in which red, green, blue, and silver areas were mixed by reflection of the small film pieces (R), (G), (B), and (S) was visually recognized in the display surface. The phase difference layers were visually recognized as a transparent member, and the star shapes were almost visually unrecognizable. The difference in brightness between the areas of the star shapes and the other area on the display surface was not visually recognized and did not change even with rotation.

On the other hand, in the observation via polarized sunglasses, the star shapes of the phase difference layers were visually recognized. The difference in brightness between the areas of the star shapes and the other area on the display surface changed with rotation. Since the azimuth angles of the plurality of phase difference layers at which the phase difference layers were the brightest were different from each other, a design effect in which the plurality of star shapes sequentially became brighter one by one in random order due to rotation was obtained. Due to the reflection of red, green, blue, and silver light, the shapes of the phase difference layer and the change of brightness thereof were more clearly visually recognized than those in Example 1.

In the area of each star shape, there were mixed minute areas of red, green, blue, and silver colors based on the small film pieces (R), (G), (B), and (S), but regardless of the difference of these colors, the mode of brightness change within one star shape was uniform. Therefore, even if the small film pieces of various colors were mixed, the identification function of the present application in a uniform manner was easily obtained, and therefore, the identification function and the high degree of design freedom were obtained at the same time.

Example 4

(4-1. Light Reflection Layer)

An adhesive agent was applied onto the upper surface of the light absorption layer horizontally placed. The flakes (R), (G), (B), and (S) obtained in Production Example 5 were disposed thereon in a mixed manner and adhesion of the flakes was effected, thereby forming a light reflection layer which was a layer in which the flakes (R), (G), (B), and (S) were mixed.

(4-2. Phase Difference Layer)

Furthermore, a plurality of λ/4 stretched resin films having a star shape obtained in Production Example 7 were attached as a phase difference layer via an adhesive agent so as to cover a partial area of the surface of the light reflection layer. The plurality of λ/4 stretched resin films were disposed in a state in which their slow axis directions were not aligned and were randomly oriented in various directions. In this manner, an identification medium including the light absorption layer, the light reflection layer, and the phase difference layers was obtained.

(4-3. Observation)

The identification medium obtained in (4-2) was observed by the same manner as that of (1-3) of Example 1.

In the observation with the naked eye, a state in which red, green, blue, and silver areas were mixed by reflection of the flakes (R), (G), (B), and (S) was visually recognized in the display surface. The phase difference layers were visually recognized as a transparent member, and the star shapes were almost visually unrecognizable. The difference in brightness between the areas of the star shapes and the other area on the display surface was not visually recognized and did not change even with rotation.

On the other hand, in the observation via polarized sunglasses, the star shapes of the phase difference layers were visually recognized. The difference in brightness between the areas of the star shapes and the other area on the display surface changed with rotation. Since the azimuth angles of the plurality of phase difference layers at which the phase difference layers were the brightest were different from each other, a design effect in which the plurality of star shapes sequentially became brighter one by one in random order due to rotation was obtained. Due to the reflection of red, green, blue, and silver light, the shapes of the phase difference layer and the change of brightness thereof were more clearly visually recognized than those in Example 1.

In the area of each star shape, there were mixed areas of red, green, blue, and silver colors based on the flakes (R), (G), (B), and (S), but regardless of the difference of these colors, the mode of brightness change within one star shape was uniform. Therefore, even if the flakes of various colors were mixed, the identification function of the present application in a uniform manner was easily obtained, and therefore, the identification function and the high degree of design freedom were obtained at the same time.

Example 5

(5-1. Light Reflection Layer)

Using the pigment (S) obtained in Production Example 6, a coating paint was prepared. On the upper surface of the light absorption layer placed horizontally, a pattern shape was drawn with the coating paint and dried to form a light reflection layer which was a layer of the pigment (S).

(5-2. Phase Difference Layer)

Furthermore, a plurality of λ/4 stretched resin films having a star shape obtained in Production Example 7 were attached as a phase difference layer via an adhesive agent so as to cover a partial area of the surface of the light reflection layer. The plurality of λ/4 stretched resin films were disposed in a state in which their slow axis directions were not aligned and were randomly oriented in various directions. In this manner, an identification medium including the light absorption layer, the light reflection layer, and the phase difference layers was obtained.

(5-3. Observation)

The identification medium obtained in (5-2) was observed by the same manner as that of (1-3) of Example 1.

In the observation with the naked eye, a silver color due to reflection by the pigment (S) and a black color of the light absorption layer in an area on which the pattern shape of the pigment (S) was not disposed were visually recognized in the display surface. The phase difference layers were visually recognized as a transparent member, and the star shapes were almost visually unrecognizable. The difference in brightness between the areas of the star shapes and the other area on the display surface was not visually recognized and did not change even with rotation.

On the other hand, in the observation via polarized sunglasses, the star shapes of the phase difference layers were visually recognized in the area where the light reflection layer and the phase difference overlapped. The difference in brightness between the areas of the star shapes and the other area on the display surface changed with rotation. Since the azimuth angles of the plurality of phase difference layers at which the phase difference layers were the brightest were different from each other, a design effect in which the plurality of star shapes sequentially became brighter one by one in random order due to rotation was obtained.

In addition, a high degree of design freedom was obtained because the pattern shape was able to be freely drawn by the pigment (S).

Example 6

On a table, a cholesteric material layer sheet (G) obtained in Production Example 4 was horizontally placed as a light reflection layer. Furthermore, a plurality of λ/4 stretched resin films having a star shape obtained in Production Example 7 were attached as a phase difference layer via an adhesive agent so as to cover a partial area of the surface of the light reflection layer. The plurality of λ/4 stretched resin films were disposed in a state in which their slow axis directions were not aligned and were randomly oriented in various directions. In this manner, an identification medium including the light reflection layer and the phase difference layers was obtained.

The obtained identification medium was observed by the same manner as that of (1-3) of Example 1. In the observation with the naked eye, a green color due to reflection of the cholesteric material layer sheet (G) was visually recognized in the display surface. Since the cholesteric material layer sheet (G) was translucent, the green color of the cholesteric material layer sheet (G) was visually recognized in a state in which the color of the surface of the table was also mixed. The phase difference layers were visually recognized as a transparent member, and the star shapes were almost visually unrecognizable. The difference in brightness between the areas of the star shapes and the other area on the display surface was not visually recognized and did not change even with rotation.

On the other hand, in the observation via polarized sunglasses, the star shapes of the phase difference layers were visually recognized. The difference in brightness between the areas of the star shapes and the other area on the display surface changed with rotation. Since the azimuth angles of the plurality of phase difference layers at which the phase difference layers were the brightest were different from each other, a design effect in which the plurality of star shapes sequentially became brighter one by one in random order due to rotation was obtained. Since the light absorption layer was not present and the background was visually recognized, the shapes of the phase difference layer and the change of brightness thereof were slightly unclear compared to that of Example 1, while a design effect that the identification medium was able to be brought into a see-through state was obtained.

Example 7

An identification medium was obtained and observed by the same manner as that of Example 4, except that a plurality of pieces of layer A contained in the film piece obtained in Production Example 8 were disposed in (4-2) instead of disposing the plurality of pieces of the λ/4 stretched resin film obtained in Production Example 7. Specifically, the operation of disposing the layer A was performed by attaching the surface of the film piece of the multilayer film on the side of the layer A to the light reflection layer via an adhesive agent, and further peeling a supporting substrate. The plurality pieces of layers A were disposed in a state in which their slow axis directions were not aligned and were randomly oriented in various directions.

In the observation with the naked eye, a state in which red, green, blue, and silver areas were mixed by reflection of the flakes (R), (G), (B), and (S) was visually recognized in the display surface. The difference between the inside and the outside of the star shape of the multilayer product 1 was almost visually unrecognizable. The difference in brightness between the areas of the star shapes and the other area on the display surface was not visually recognized and did not change even with rotation.

On the other hand, in the observation via polarized sunglasses, the inside of the star shape functioned as a phase difference layer, and the star shapes of the phase difference layers were visually recognized. The difference in brightness between the areas of the star shapes and the other area on the display surface changed with rotation, and the same advantageous effects as those in Example 4 were obtained. In addition, the black color in the state in which the phase difference layers were darkest was darker than that in Example 4, and it was a sharp black color in which chromatic color was less mixed.

Example 8

An identification medium was obtained and observed by the same manner as that of Example 4, except that the multilayer product 3 obtained in Production Example 9 was disposed in (4-2) instead of disposing a plurality of pieces of the λ/4 stretched resin film obtained in Production Example 7.

In the observation with the naked eye, a state in which red, green, blue, and silver areas were mixed by reflection of the flakes (R), (G), (B), and (S) was visually recognized in the display surface. The difference between the inside and the outside of the star shape of the multilayer product 3 was almost visually unrecognizable. The difference in brightness between the areas of the star shapes and the other area on the display surface was not visually recognized and did not change even with rotation.

On the other hand, in the observation via polarized sunglasses, the inside of the star shape functioned as a phase difference layer, and the star shapes of the phase difference layers were visually recognized. The difference in brightness between the areas of the star shapes and the other area on the display surface changed with rotation, and the same advantageous effects as those in Example 4 were obtained. In addition, the black color in the state in which the phase difference layers were darkest was darker than that in Example 4, and it was a sharp black color in which chromatic color was less mixed. However, since the slow axes of the phase difference layers were aligned in the same direction in all star shapes, the design effect that the plurality of star shapes sequentially became brighter one by one was not obtained, but the brightness of all star shapes uniformly changed with rotation.

Example 9

An identification medium was obtained and observed by the same manner as that of Example 4, except that the multilayer product 5 obtained in Production Example 10 was disposed in (4-2) instead of disposing the plurality of pieces of the λ/4 stretched resin film obtained in Production Example 7.

In the observation with the naked eye, a state in which red, green, blue, and silver areas were mixed by reflection of the flakes (R), (G), (B), and (S) was visually recognized in the display surface. The difference between the inside and the outside of the star shape of the multilayer body 5 was almost visually unrecognizable. The difference in brightness between the areas of the star shapes and the other area on the display surface was not visually recognized and did not change with rotation.

On the other hand, in the observation via polarized sunglasses, the inside of the star shape functioned as a phase difference layer, and the star shapes of the phase difference layers were visually recognized. The difference in brightness between the areas of the star shapes and the other area on the display surface changed with rotation, and the same advantageous effects as those in Example 4 were obtained. In addition, the black color in the state in which the phase difference layers were darkest was darker than that in Example 4, and it was a sharp black color in which chromatic color was less mixed. However, since the slow axes of the phase difference layers were aligned in the same direction in all star shapes, the design effect that the plurality of star shapes sequentially became brighter one by one was not obtained, but the brightness of all star shapes uniformly changed with rotation. On the outside of the star shapes, change with rotation was almost visually unrecognizable, but a slight change in coloration was observed compared to Example 4.

Example 10

The light absorption layer was horizontally placed, and a linear polarizer as a light reflection layer was attached to the upper surface of the light absorption layer via an adhesive agent. As the linear polarizer, a film (trade name "DBEF", manufactured by 3M Limited) that was a laminate of a large number of thin films was used.

Furthermore, a plurality of λ/2 stretched resin films having a star shape obtained in Production Example 11 were attached via an adhesive agent as a phase difference layer so as to cover a partial area of the surface of the light reflection layer. The slow axis directions of the plurality of λ/2 stretched resin films were aligned in a direction that forms an angle of 45° with respect to the transmission axis of the light reflection layer. In this manner, an identification medium including the light absorption layer, the light reflection layer, and the phase difference layers was obtained. The obtained identification medium was observed by the same manner as that of (1-3) of Example 1.

In the observation with the naked eye, a silver color due to reflection by the linear polarizer was visually recognized in the display surface. The phase difference layers were visually recognized as a transparent member, and the star shapes were almost visually unrecognizable. The difference in brightness between the areas of the star shapes and the other area on the display surface was not visually recognized and did not change even with rotation.

On the other hand, in the observation via polarized sunglasses, the star shapes of the phase difference layers were visually recognized. The difference in brightness between the areas of the star shapes and the other area on the display surface changed with rotation. Due to the reflection of the silver light, the shapes of the phase difference layer and the change of brightness thereof were clearly visually recognized equivalently to Example 2. However, since the slow axes of the phase difference layers were aligned in the same direction in all star shapes, the design effect that the plurality of star shapes sequentially became brighter one by one was not obtained, but the brightness of all star shapes uniformly changed with rotation.

Example 11

As a linear polarizer which serves as a light reflection layer, a wire grid polarizer (trade name "WGPF-30C", manufactured by Sigma Koki Co., Ltd.) was used instead of the film that was the laminate of a large number of thin films. Except for this change, an identification medium was obtained and observed by the same manner as that of Example 10.

In the observation with the naked eye, a silver color due to reflection by the linear polarizer was visually recognized in the display surface. The phase difference layers were visually recognized as a transparent member, and the star shapes were almost visually unrecognizable. The difference in brightness between the areas of the star shapes and the other area on the display surface was not visually recognized and did not change even with rotation.

On the other hand, in the observation via polarized sunglasses, the star shapes of the phase difference layers were visually recognized. The difference in brightness between the areas of the star shapes and the other area on the display surface changed with rotation. Due to the reflection of the silver light, the shapes of the phase difference layer and the change of brightness thereof were clearly visually recognized equivalently to Example 2. However, since the slow axes of the phase difference layers were aligned in the same direction in all star shapes, the design effect that the plurality of star shapes sequentially became brighter one by one was not obtained, but the brightness of all star shapes uniformly changed with rotation.

Example 12

An adhesive agent was applied onto the upper surface of the light absorption layer horizontally placed. The flakes (R), (G), (B), and (S) obtained in Production Example 5 were disposed thereon in a mixed manner and adhesion of the flakes was effected, thereby forming a light reflection layer which was a layer in which the flakes (R), (G), (B), and (S) were mixed. Furthermore, a plurality of λ/4 stretched resin films having a star shape obtained in Production Example 7 were attached as a phase difference layer via an adhesive agent so as to cover a partial area of the surface of the light reflection layer, thereby obtaining a laminate. The plurality of λ/4 stretched resin films were disposed in a state in which their slow axis directions were not aligned and were randomly oriented in various directions.

Furthermore, from above this laminate, an acrylic resin liquid (a commercially available ultraviolet curable acrylic resin liquid, which will also be used hereinafter) was poured. Irradiation thereof with ultraviolet rays for 2 minutes by an ultraviolet light emission LED was performed to cure the acrylic resin liquid. In this manner, an identification medium including the light absorption layer, the light reflection layer, and the phase difference layers embedded in the acrylic resin was obtained. The obtained identification medium was observed by the same manner as that of (1-3) of Example 1.

In the observation with the naked eye, a state in which red, green, blue, and silver areas were mixed by reflection of the flakes (R), (G), (B), and (S) was visually recognized in the display surface. Since the phase difference layers were embedded with the acrylic resin, the edge portion was not conspicuous, and the degree of visibility of the star shapes was even lower than that in Example 4. The difference in brightness between the areas of the star shapes and the other area on the display surface was not visually recognized and did not change even with rotation.

On the other hand, in the observation via polarized sunglasses, the star shapes of the phase difference layers were visually recognized. The difference in brightness between the areas of the star shapes and the other area on the display surface changed with rotation, and the same advantageous effects as those in Example 4 were obtained.

Example 13

An adhesive agent was applied onto the upper surface of the light absorption layer horizontally placed. The flakes (R), (G), (B), and (S) obtained in Production Example 5 and small pieces of glossy metal were disposed in a mixed manner and adhesion thereof was effected, thereby forming a light reflection layer which was a layer in which they were mixed. Furthermore, a plurality of λ/4 stretched resin films having a star shape obtained in Production Example 7 were attached as a phase difference layer via an adhesive agent so as to cover a partial area of the surface of the light reflection layer. The plurality of λ/4 stretched resin films were disposed in a state in which their slow axis directions were not aligned and were randomly oriented in various directions.

From above, an acrylic resin liquid was poured. Irradiation thereof with ultraviolet rays for 2 minutes by an ultraviolet light emission LED was performed to cure the acrylic resin liquid. In this manner, an identification medium including the light absorption layer, the metal pieces, the light reflection layer, and the phase difference layers embedded in the acrylic resin was obtained. The obtained identification medium was observed by the same manner as that of (1-3) of Example 1.

In the observation with the naked eye, a state in which red, green, blue, and silver areas were mixed by reflection of the flakes (R), (G), (B) and (S) and metal pieces was visually recognized in the display surface. Since the phase difference layers were embedded with the acrylic resin, the edge portion was not conspicuous, and the degree of visibility of the star shapes was even lower than that in Example 4. The difference in brightness between the areas of the star shapes and the other area on the display surface was not visually recognized and did not change with rotation.

On the other hand, in the observation via polarized sunglasses, the star shapes of the phase difference layers were visually recognized. In the area where the phase difference layers overlapped with the flakes (R), (G), (B), and (S), the difference in brightness between the areas of the star shapes and the other area on the display surface changed with rotation, and the same advantageous effects as those in Example 4 were obtained. In the area where the flakes (R), (G), (B), and (S) were not present and the metal pieces were present, the brightness in the areas of the phase difference layers was not changed, so that the design effect in which the brightness changed only in a partial area was obtained.

Example 14

An adhesive agent was applied onto the upper surface of the light absorption layer horizontally placed. The flakes (R), (G), (B), and (S) obtained in Production Example 5 were disposed in a mixed manner and adhesion of the flakes was effected, thereby forming a light reflection layer which was a layer in which the flakes (R), (G), (B), and (S) were mixed.

Both ends in the longitudinal direction of a cellophane tape were gripped with fingers and stretched to obtain a tape having phase difference unevenness. This tape was affixed to a partial area of the upper surface of the light reflection layer. A plurality of λ/4 stretched resin films having a star shape obtained in Production Example 7 were attached as a phase difference layer via an adhesive agent so as to cover a partial area of the surface of the light reflection layer and the cellophane tape. The plurality of λ/4 stretched resin films were disposed in a state in which their slow axis directions were not aligned and were randomly oriented in various directions.

Furthermore, from above, an acrylic resin liquid was poured. Irradiation thereof with ultraviolet rays for 2 minutes by an ultraviolet light emission LED was performed to cure the acrylic resin liquid. In this manner, an identification medium including the light absorption layer, the cellophane tape, the light reflection layer, and the phase difference layers embedded in the acrylic resin was obtained. The obtained identification medium was observed by the same manner as that of (1-3) of Example 1.

In the observation with the naked eye, a state in which red, green, blue, and silver areas were mixed by reflection of the flakes (R), (G), (B), and (S) was visually recognized in the display surface. Since the phase difference layers were embedded with the acrylic resin, the edge portion was not conspicuous, and the degree of visibility of the star shapes was even lower than that in Example 4. The difference in brightness between the areas of the star shapes and the other area on the display surface was not visually recognized and did not change even with rotation. Similar to the phase difference layer, the edge portion of the cellophane tape was not conspicuous and was almost visually unrecognizable.

On the other hand, in the observation via polarized sunglasses, the star shapes of the phase difference layers were visually recognized. In the area where the phase difference layers overlapped with the flakes (R), (G), (B), and (S), the difference in brightness between the areas of the star shapes and the other area on the display surface changed with rotation, and the same advantageous effects as those in Example 4 were obtained. In the area where the phase difference layers overlapped with the cellophane tape, there was no change in brightness of the area of such a phase difference layer, and the change in the unevenness of brightness and color due to the phase difference unevenness of the cellophane tape was visually recognized.

Example 15

In a mold frame made of silicone, an acrylic resin liquid was poured. Irradiation thereof with ultraviolet rays for curing was performed to form an acrylic resin layer. Furthermore, an acrylic resin liquid was poured thereon to form an acrylic resin liquid layer. The phase difference layers on the back side, the light reflection layer, and the phase difference layers on the front side were embedded in this order in the acrylic resin liquid layer. As the phase difference layers on the back side and the phase difference layers on the front side, a plurality of λ/4 stretched resin films having a star shape obtained in Production Example 7 were used. As the light reflection layer, the flakes (R), (G), (B), and (S) obtained in Production Example 5 were used in a mixed manner. The plurality of λ/4 stretched resin films as the phase difference layer on the back side and the phase difference layer on the front side were placed in a state in which their slow axis directions were not aligned and were randomly oriented in various directions. An acrylic resin liquid was further poured thereon, and the surface was flattened. Irradiation thereof with ultraviolet rays was performed to cure the acrylic resin liquid. In this manner, an identification medium including the back-side phase difference layer, the substrate film, the light reflection layer, and the front-side phase difference layer embedded in the acrylic resin was constituted. The obtained identification medium was observed by the same manner as that of (1-3) of Example 1. As the observation, both the observation from the front side and the observation from the back side were performed.

In the observation with the naked eye, a state in which red, green, blue, and silver areas were mixed by reflection of the flakes (R), (G), (B), and (S) was visually recognized in the display surface. Since the phase difference layers were embedded with the acrylic resin, the edge portion was not conspicuous, and the degree of visibility of the star shape was even lower than that in Example 4. The difference in brightness between the areas of the star shapes and the other area on the display surface was not visually recognized and did not change even with rotation. The observation results were the same for observations from the front side and from the back side.

On the other hand, in the observation via polarized sunglasses, the star shape of the phase difference layer on the front side was visually recognized in the observation from the front side, and the star shape of the phase difference layer on the back side was visually recognized in the observation from the back side. Since the light absorption layer was not present and the background was visually recognized, the shapes of the phase difference layer and the change of brightness thereof were slightly unclear compared to that of Example 1, while a design effect that the identification medium was able to be brought into a see-through state and a design effect that the changes in the brightness by the different phase difference layers were visually recognized by the observation from the front side and the observation from the back side were obtained.

Example 16

An identification medium was obtained and observed by the same manner as that of Example 12, except that embedding using a silicone resin liquid was performed instead of performing embedding by photocuring an acrylic resin liquid. As a silicone resin liquid, a resin liquid that contains a curing agent and that cures by the lapse of time of standing still at normal temperature was prepared. This liquid was poured from above a laminate including a light reflection layer, a phase difference layer, and the like, and was left to stand for effecting embedding.

The observation was performed, and the same observation results as those in Example 12 were obtained. In addition, the cured silicone resin was more flexible than the acrylic resin. Therefore, the obtained identification medium was highly flexible and had a capability of being affixed as a badge or the like to an article which is required to have flexibility such as clothes.

Example 17

(17-1. Diffusion Film)

An adhesive composition consisting of 40 parts by weight of an ethylene-vinyl acetate copolymer emulsion (40% by weight of nonvolatile content, 40% by weight of vinyl acetate content), 35 parts by weight of a petroleum resin emulsion (40% by weight of nonvolatile content, resin softening point of 85° C.), and 10 parts by weight of a paraffin wax emulsion (40% by weight of nonvolatile content, resin softening point of 64° C.) was prepared. The shear storage modulus thereof at 23° C. was 10 MPa. To this adhesive composition, fine particles (shape:spherical, material:polystyrene, refractive index:1.59) with a diameter of 4 μm were added to obtain a diffusion adhesive composition. The amount of the fine particles added was adjusted so that the haze of the obtained diffusion film was 40%.

Two transparent films (unstretched ZEONOR film, product name "ZF14", manufactured by ZEON Corporation, with a thickness of 40 μm, front phase difference of 3 nm or less) were subjected to a corona treatment. The diffusion adhesive composition was applied onto one of the films, and the other film was placed thereon to obtain a stack product. A pressure was applied to the stack product by a laminator to perform lamination. In this manner, a diffusion film having two transparent films and a diffusion layer interposed therebetween was obtained.

(17-2. Identification Medium)

On the identification medium obtained in (4-2) of Example 4, the diffusion film obtained in (17-1) was further placed so as to cover the entire display surface. In this manner, an identification medium including the light absorption layer, the light reflection layer, the phase difference layer, and the diffusion film was obtained.

The obtained identification medium was observed by the same manner as that of (1-3) of Example 1. As a result, the same advantageous effects as those in Example 4 were obtained.

Furthermore, observation from an oblique direction was performed. That is, while the identification medium was maintained in a state of being placed horizontally, its azimuth angle was rotated by 360°. Observation was performed from the polar angles in the range of 0° to 60° from the vertical direction. As the observation, both the observation with the naked eye and the observation via a linear polarizer of polarized sunglasses were performed. The observation was performed in a bright room with a fluorescent lamp as a light source. Similar observations were made on the identification medium obtained in Example 4, and the results were compared.

In the observation with the naked eye, similar results to observation from the vertical direction were obtained.

On the other hand, in the observation via polarized sunglasses, the larger the polar angle, the more ambiguous the star shape of the phase difference layer and the change of the difference in brightness between the areas of the star shapes and the other area became. However, when comparing the observation results of Example 17 with the observation results of Example 4, Example 17 came to observation results in which the star shape of the phase difference layer and the change of the difference in brightness between the areas of the star shapes and the other area were relatively clear even at a large polar angle.

Comparative Example 1

An identification medium was obtained and observed by the same manner as that of Examples 1 and 2 except that an aluminum foil was used instead of the cholesteric material layer sheet as the light reflection layer.

In the observation with the naked eye, a silver color due to reflection by the aluminum foil was visually recognized in the display surface. The phase difference layers were visually recognized as a transparent member, and the star shapes were almost visually unrecognizable. The difference in brightness between the areas of the star shapes and the other area on the display surface was not visually recognized and did not change even with rotation.

Also in the observation via polarized sunglasses, the phase difference layers were visually recognized as a transparent member, and the star shapes were almost visually unrecognizable. The difference in brightness between the areas of the star shapes and the other area on the display surface was not visually recognized and did not change even with rotation. Thus, at any azimuth angle, the star shape was not visually recognized more clearly than observation with the naked eye.

Comparative Example 2

An identification medium was obtained and observed by the same manner as that of Example 4, except that an isotropic resin film having a star shape obtained in Production Example 12 was used instead of the λ/4 stretched resin film.

In the observation with the naked eye, a state in which red, green, blue, and silver areas were mixed by reflection of the flakes (R), (G), (B), and (S) was visually recognized in the display surface. The star-shaped isotropic resin film was visually recognized as a transparent member, and the star shapes were almost visually unrecognizable. The difference in brightness between the areas of the star shapes and the other area on the display surface was not visually recognized and did not change even with rotation.

Also in the observation via polarized sunglasses, the star-shaped isotropic resin film was visually recognized as a transparent member, and the star shapes were almost visually unrecognizable. The difference in brightness between the areas of the star shapes and the other area on the display surface was not visually recognized and did not change even with rotation. Thus, at any azimuth angle, the star shape was not visually recognized more clearly than observation with the naked eye.

Comparative Example 3

An identification medium was obtained and observed by the same manner as that of Examples 1 and 2, except that an aluminum foil was used instead of the cholesteric material layer sheet as the light reflection layer, and an isotropic resin film having a star shape obtained in Production Example 12 was used instead of the λ/4 stretched resin film.

In the observation with the naked eye, a silver color due to reflection by the aluminum foil was visually recognized in the display surface. The phase difference layers were visually recognized as a transparent member, and the star shapes were almost visually unrecognizable. The difference in brightness between the areas of the star shapes and the other area on the display surface was not visually recognized and did not change even with rotation.

Also in the observation via polarized sunglasses, the star-shaped isotropic resin film was visually recognized as a transparent member, and the star shapes were almost visually unrecognizable. The difference in brightness between the areas of the star shapes and the other area on the display surface was not visually recognized and did not change even with rotation. Thus, at any azimuth angle, the star shape was not visually recognized more clearly than observation with the naked eye.

REFERENCE SIGN LIST

50 identification medium
100 identification medium
101(R) light reflection layer
101(R)U upper surface of light reflection layer 101(R)
102 patterned phase difference layer
102(N) isotropic layer
102 (Xy) layer functioning as a λ/4 wave plate
102U upper-side surface of patterned phase difference layer 102 side
191(X) observational linear polarizer
191(Y) observational linear polarizer
200 identification medium
201(Y) light reflection layer
201(Y)U upper surface of light reflection layer 201(Y)
202 patterned phase difference layer
202(N) isotropic layer
202(Xy) layer functioning as a λ/2 wave plate
202U upper-side surface of patterned phase difference layer 202 side
501(P) cut pieces of light reflection layer
501(S) silver light reflection layer
502 phase difference layer
511 substrate
512 transparent substrate
521 light absorption layer
531 diffusion film
541 transparent resin portion
542 transparent resin portion
543 transparent resin portion

590 mounting member
591 tray
592 ring
A102(Xy) arrow showing slow axis direction
A111(N) light
A112(N) light
A113(R) light
A114(Y) light
A115(*n*) light
A115(Y) light
A119(L) light
A121(N) light
A122(N) light
A123(R) light
A124(R) light
A125(X) light
A125(Y) light
A129(L) light
A191(X) arrow showing transmission axis direction
A211(X) light
A211(Y) light
A212(L) light
A212(R) light
A213(*n*) light
A213(R) light
A214(*n*) light
A214(Y) light
A219(L) light
A219(*n*) light
A221(X) light
A221(Y) light
A222(X) light
A222(Y) light
A223(R) light
A224(R) light
A229(L) light
A311(N) light
A312(N) light
A313(X) light
A314(Y) light
A315(*n*) light
A315(Y) light
A319(Y) light
A321(N) light
A322(N) light
A323(X) light
A324(X) light
A325(*n*) light
A325(X) light
A329(Y) light
A411(X) light
A411(Y) light
A412(X) light
A412(Y) light
A413(*n*) light
A413(X) light
A414(*n*) light
A414(Y) light
A419(*n*) light
A419(Y) light
A421(X) light
A421(Y) light
A422(X) light
A422(Y) light
A423(*n*) light
A423(X) light
A424(*n*) light
A424(X) light
A429(*n*) light
A429(Y) light

The invention claimed is:

1. An identification medium comprising a light reflection layer and a patterned phase difference layer, wherein the light reflection layer is a reflection-type circular polarizer, the patterned phase difference layer is a layer that includes an area having a phase difference, and is a layer provided in the identification medium so that the area having a phase difference occupies a partial area of a display surface of the identification medium, and the patterned phase difference layer includes, as the area having a phase difference, an area that functions as a λ/4 wave plate.

2. The identification medium according to claim 1, wherein the patterned phase difference layer is provided at a position on a side closer to a viewing side than the light reflection layer.

3. The identification medium according to claim 1, comprising one or more single patterned phase difference layers as the patterned phase difference layer, the single patterned phase difference layer consisting of a single area that has a smaller size than that of the display surface of the identification medium, and has a certain phase difference.

4. The identification medium according to claim 1, comprising a plurality of areas having irregularly different directions of slow axes as the area having a phase difference.

5. The identification medium according to claim 1, wherein the light reflection layer is a cut piece of a material having cholesteric regularity.

6. The identification medium according to claim 1, wherein the light reflection layer include two or more areas giving different polarization states to reflected light.

7. The identification medium according to claim 1, wherein a reflectance ratio of an unpolarized light having been incident on one or more areas of the light reflection layer and reflected by the light reflection layer is 35 to 50% at all wavelengths in a wavelength region of 420 nm to 650 nm.

8. The identification medium according to claim 1, further comprising a light absorption layer on a side of the light reflection layer opposite to a viewing side.

9. The identification medium according to claim 1, further comprising a diffusion layer provided at a position on a side closer to a viewing side than the patterned phase difference layer.

10. The identification medium according to claim 1, further comprising a transparent resin member, in which part or all members other than the transparent resin member are embedded.

11. The identification medium according to claim 1, further comprising a mounting member for attachment to an article.

12. An article comprising the identification medium according to claim 1.

13. The article according to claim 12, further comprising a polarizer viewer.

14. A method for using the identification medium according to claim 1, comprising:

causing incidence of incident light on the display surface of the identification medium and reflection of the incident light by the light reflection layer to convert the incident light into reflected light, and observing the reflected light, wherein unpolarized light is made incident as the incident light, and in observation of the reflected light, a linear polarization component or a circular polarization component of the reflected light is selectively observed.

15. The method for using the identification medium according to claim 14, wherein the selective observation is performed by visually observing the reflected light via a linear polarizer being separated away from the identification medium.

16. The method for using the identification medium according to claim 15, wherein the linear polarizer is polarized sunglasses.

17. A method for using the identification medium according to claim 1, comprising:

causing incidence of incident light on the display surface of the identification medium and reflection of the incident light by the light reflection layer to convert the incident light into reflected light, and observing the reflected light, wherein linearly polarized light, circularly polarized light, or elliptically polarized light is made incident as the incident light.

* * * * *